United States Patent
Ramoji et al.

(10) Patent No.: US 10,268,984 B1
(45) Date of Patent: Apr. 23, 2019

(54) INVENTORY ITEM RELEASE LOCATIONS

(71) Applicant: Amazon Technologies, Inc., Seattle, WA (US)

(72) Inventors: Sudheer Babu Ramoji, Redmond, WA (US); Avishkar Misra, Redmond, WA (US); Yasser Baseer Asmi, Redmond, WA (US); Ohil Krishnamurthy Manyam, Bellevue, WA (US); Gopi Prashanth Gopal, Redmond, WA (US); Long Xuan Nguyen, Seattle, WA (US); Sudarshan Narasimha Raghavan, Snoqualmie, WA (US); Ramanathan Palaniappan, Issaquah, WA (US); Nadya Dhalla, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/500,805

(22) Filed: Sep. 29, 2014

(51) Int. Cl.
*G06F 7/00* (2006.01)
*G06Q 10/08* (2012.01)

(52) U.S. Cl.
CPC .................. *G06Q 10/087* (2013.01)

(58) Field of Classification Search
CPC .................................................. G06Q 10/087
USPC ........................................................ 700/214
See application file for complete search history.

(56) References Cited

U.S. PATENT DOCUMENTS

| | | | |
|---|---|---|---|
| 7,225,980 B2 | 6/2007 | Ku et al. | |
| 7,394,380 B2 * | 7/2008 | Ballin | G06Q 10/08 235/375 |
| 7,693,758 B1 * | 4/2010 | Bacco | G06Q 10/08 348/143 |
| 7,769,221 B1 * | 8/2010 | Shakes | B07C 3/14 382/141 |
| 7,949,568 B2 | 5/2011 | Fano et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 * | 4/2013 | Rouaix | B65G 1/1373 705/28 |
| 8,630,924 B2 | 1/2014 | Groenevelt et al. | |
| 8,688,598 B1 * | 4/2014 | Shakes | G06Q 10/08 705/29 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Kyle O Logan
(74) *Attorney, Agent, or Firm* — Athorus, PLLC

(57) ABSTRACT

This disclosure describes an item drop location for placing items that have been picked from an inventory location within a material handling facility but have not yet been transitioned from the materials handling facility and a return location for returning items that have been transitioned from the materials handling facility. Likewise, described is a system and method for identifying an item placed at a drop location or an item placed at a return location, processing the placed item and providing confirmation to a user that placed the item and facilitating a return of the item or a removal of the item from an item identifier list associated with the user.

23 Claims, 15 Drawing Sheets

(56) References Cited

U.S. PATENT DOCUMENTS

| | | |
|---|---|---|
| 9,235,928 B2 | 1/2016 | Medioni et al. |
| 9,473,747 B2 | 10/2016 | Kobres et al. |
| 2003/0002712 A1 | 1/2003 | Steenburgh et al. |
| 2004/0181467 A1* | 9/2004 | Raiyani ............... G06Q 10/087 705/28 |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0284132 A1 | 11/2012 | Kim et al. |
| 2013/0076898 A1* | 3/2013 | Philippe ................ H04N 7/18 348/143 |
| 2013/0253700 A1 | 9/2013 | Carson et al. |
| 2013/0284806 A1 | 10/2013 | Margalit |
| 2014/0084060 A1 | 3/2014 | Jain et al. |
| 2014/0279294 A1 | 9/2014 | Field-Darragh et al. |
| 2015/0019391 A1* | 1/2015 | Kumar ................ G06Q 10/087 705/28 |
| 2015/0029339 A1* | 1/2015 | Kobres ................ H04N 7/181 348/150 |
| 2015/0073907 A1 | 3/2015 | Purves et al. |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

INVENTORY ITEM RELEASE LOCATIONS

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

In some instances, when an item is picked from a storage location (e.g., to fulfill an order), the agent that picked the item may determine that they have picked the wrong item or too many of the same item. Likewise, when a customer purchases an item, they sometimes decide, later, that they would like to return the item.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
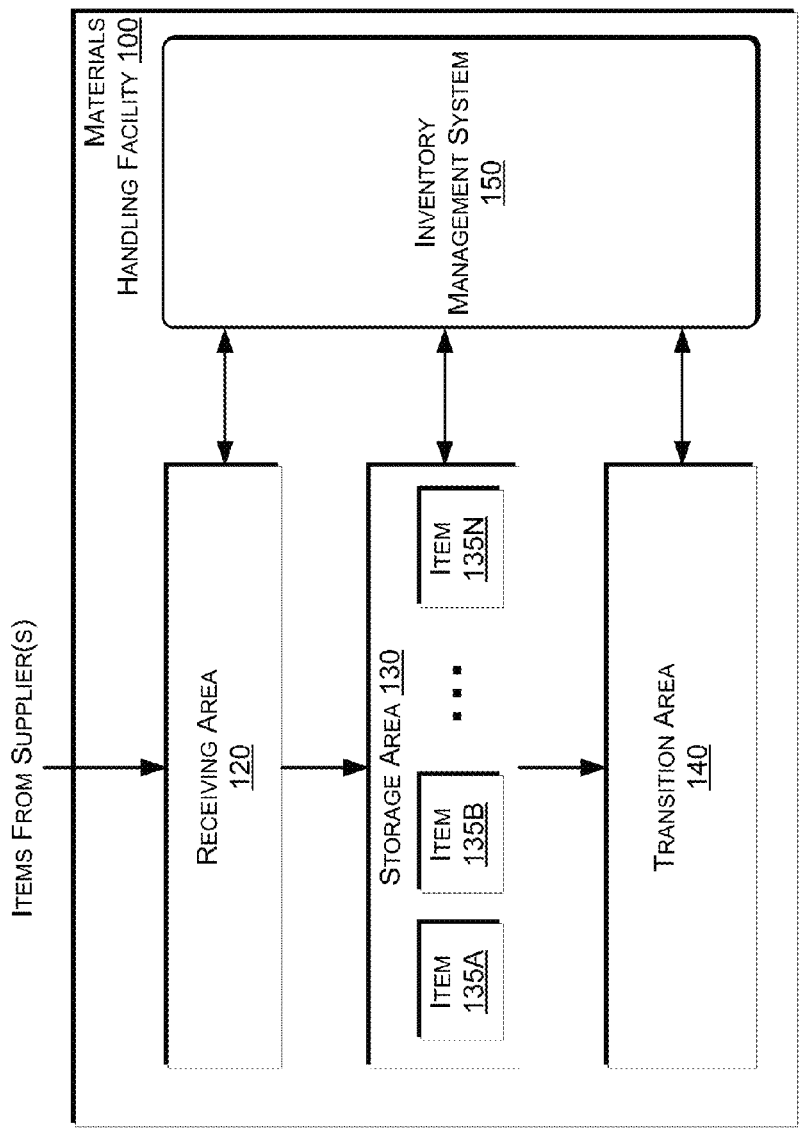
FIG. 1A is a block diagram illustrating a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an item drop location for placing items that have been picked from an inventory location within a material handling facility but have not yet been transitioned from the materials handling facility and an item return location for returning items that have been transitioned from the materials handling facility or from an affiliate of the materials handling facility. Likewise, described is a system and method for identifying an item placed at a drop location or an item placed at a return location, processing the placed item and providing confirmation to a user that placed the item. For example, a user, such as a picking agent within a materials handling facility, may pick an item from inventory. When an item is picked, the user that picked the item and the item are automatically determined and an item identifier representative of the picked item is added to an item identifier list associated with the user.

If, while the user is still located in the materials handling facility, the user decides they do not want or need the item (e.g., the picking agent realizes that he/she picked the wrong item), rather than requiring the user to return the item to the storage location from which it was originally picked, the user may place the item at a drop location positioned within the materials handling facility. When an item is placed at a drop location, the user and the item are automatically identified and the item is removed from the item identifier list associated with the user.

When a user leaves a materials handling facility, items identified on the item identifier list associated with the user are transitioned to the user, and the user may be charged for the purchase, use, lease, rental, etc., of the item. For example, if the materials handling facility is a retail location and the user has picked three items that are added to the item identifier list associated with the user, when the user leaves the retail location, the items may be transitioned to the user (e.g., sale, rental, lease of the items completed) and the user may be charged for the items. At a later time, the user may decide that they desire to return one or more of the items. To facilitate a return, when the user returns to the materials handling facility, the user may place a previously transitioned item onto a return location. The user and the item placed on the return location are automatically identified and the return of the item is facilitated.

Utilizing the implementations described herein, users can place picked items onto a drop location and have the items removed from the item inventory list associated with the user without the user having to return to the inventory location from which the item was picked. Likewise, a user may return transitioned items at a return location without needing to provide a purchase verification (e.g., receipt) and/or optionally without needing to interact with an agent or other user. In some implementations, a user may utilize a return location at a materials handling facility to return items obtained through other channels. For example, if the user purchases an item from an e-commerce website affiliated with the materials handling facility, the user may return the item purchased from the website using the return location at the materials handling facility.

An implementation of a materials handling facility configured to store and manage inventory items is illustrated in FIG. 1. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

As shown, a materials handling facility 100 includes a receiving area 120, a storage area 130 configured to store an arbitrary number of inventory items 135A, 135B-135N, and one or more transition areas 140. The arrangement of the various areas within materials handling facility 100 is depicted functionally rather than schematically. For example, in some implementations, multiple different receiving areas 120, storage areas 130 and/or transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a user orders or picks one or more of the items. The general flow of items through the materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location, images or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

In addition to arranging items, in some implementations, one or more images of the items may be captured as part of receiving. For example, the receiving area 120 may include cameras that capture images of the items as they are unpacked and/or otherwise prepared for storage. These images may be provided to and processed by the inventory management system 150 to identify features of the items and to determine an arrangement of those features. Features may be any identifying information included in the item (e.g., size, shape, color, wording, graphics). If the item is already known to the inventory management system 150 (e.g., inventory is already stored in the storage area) the processed item image information may be compared with item image information maintained in the item images data store to confirm that the item can be identified based on the captured image. If the item can be identified, the receive process can be completed and the item transitioned to the storage area 130. If the item cannot be identified, addition item information (e.g., weight, shape, size, color, expiration date, price) and/or images may be obtained to increase the accuracy of item identification. For example feature detection and suppression techniques may be utilized to eliminate features common across multiple items.

After arriving through receiving area 120, items 135 may be stored within storage area 130. In some implementations, like items 135 may be stored or displayed together in shelves, on shelves or via other suitable storage mechanisms, such that all items 135 of a given kind are stored in one inventory location within the storage area 130. For example, different variations of the same type of item may be stored in one inventory location within the storage area 130. In other implementations, like items 135 may be stored in different locations. For example, to optimize picking of certain items 135 having high turnover within a large physical facility, those items 135 may be stored in several different inventory locations to reduce congestion that might occur at a single point of storage. In general, the inventory management system 150 may maintain a mapping or location information identifying where within the materials handling facility each item is stored. Each inventory item may be associated with the corresponding inventory location in which it is stored and the association may be maintained in a materials handling facility item information data store 1315 (FIG. 13) accessible by the inventory management system 150.

When an order specifying one or more of the items 135 is received, or as a user progresses through the materials handling facility 100, the corresponding items 135 may be selected or "picked" from inventory locations within the storage area 130. For example, in one implementation a user may have a list of items to pick and may progress through the materials handling facility picking items 135 from the inventory locations within the storage area 130. In other implementations, materials handling facility employees may pick items 135 from inventory locations within the storage area 130 using written or electronic pick lists derived from customer orders.

As discussed in more detail below, one or more images of the item may be captured as the item is picked from the storage area 130. For example, when the user reaches an inventory location and passes their hand into an inventory location within the storage area 130, one or more images of the item may be captured as the user removes the item from the inventory location. Those images may be processed to identify and/or verify the identity of the item picked by the user. In some implementations, item identification and/or the type of item may be determined based on the inventory location from which the user picked the item. The image processing may be performed to confirm that the item associated with the inventory location actually corresponds with the picked item. In other implementations, the item may be identified based on actions of the user. For example, an identification of the item as determined by the inventory location or other means (e.g., bar code, quick response ("QR") code, bokode, radio frequency identification ("RFID"), or other visual code) may be presented to the user. If the user confirms the items identity, places the item in a tote, or otherwise acknowledges the identity of the item, such user action may be used to identify, or confirm the identity of the item.

To further illustrate, the item associated with the inventory location may initially be determined as the item picked by the user. Images are captured of the item as it is picked and processed to identify features for the item. Once the features have been identified, the arrangement of those features is compared with stored item image information maintained in the materials handling facility item information data store 1315 for the item associated with the inventory location and a correlation score determined for each comparison. If there is not a high correlation score between the arrangement of features and one or more of the stored item image information, or if none of the correlation scores satisfy a confidence threshold, the arrangement of features identified from the processed image may be compared with item image information maintained in the materials handling facility item information data store 1315 associated with other items.

If a higher correlation score is determined for another item, it may be determined that the actually picked item is not the item associated with the inventory location. In some instances, the user may be asked to confirm the identity of the item. For example, the identity of the item may be presented on a nearby display, projected onto a nearby surface and/or presented on a portable device accessible to the user. The resulting user action may be used to confirm the identity of the item. For example, if the user acknowledges the identity of the item as presented to the user, the item identity is confirmed. As another example, even if the user does not specifically acknowledge the identity of the item but performs another positive action, such as placing the item in a tote or keeping the item, the user's action can be used to confirm the identity of the item.

When a user enters or passes through a transition area 140, the items identified on the item identifier list associated with the user may be transitioned. A transition area may be any designated area within, around or near a materials handling facility. For example, the transition area may be a packing station within the materials handling and, when the user arrives at the packing station (transition area), the items identified on the item identifier list associated with the user may be transitioned from the storage area 130 to the packing station. Such information may be maintained by the inventory management system 150 to enable accurate tracking of items. Other examples of a transition area include, but are not limited to, exits from the materials handling facility, a perimeter surrounding the materials handling facility, a loading bay of the materials handling facility, a parking lot associated with the materials handling facility, and the like.

If the items are departing the materials handling facility (e.g., a carrier is taking the items for transport, a customer is purchasing or renting the items), when the user passes through the exit (transition area) of the materials handling facility, the items identified on the item identifier list are transitioned from the materials handling facility to the user. For example, if the user is purchasing the items, the ownership of the items may be transferred to the user and the user charged a fee for the items when the user exits the materials handling facility with the items.

Figure 1B:
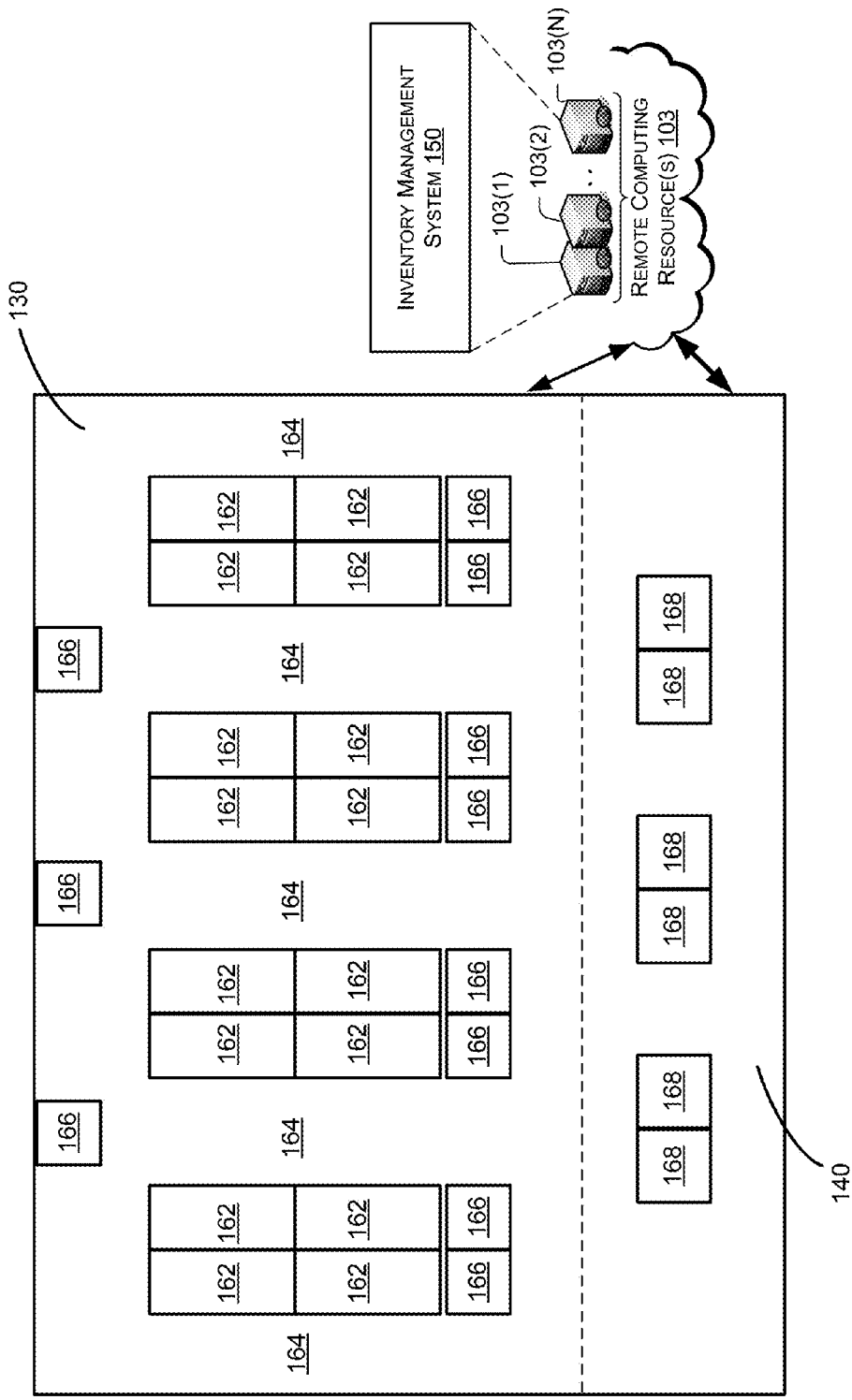
FIG. 1B is a block diagram of a storage area and a transition area of a materials handling facility, according to an implementation.

FIG. 1B is a block diagram illustrating a top down view of a storage area 130 within a materials handling facility configured to store inventory items and a transition area 140, according to an implementation. As shown, the storage area 160 includes inventory locations 162 for storing inventory items. Any number, type and/or size of inventory locations may be included in the storage area. As shown, multiple inventory locations 162 may be arranged adjacent to one another and/or across from one another to establish a series of rows 164 within the storage area 130. In this example, the inventory locations 162 are arranged in rows 164 such that a user (e.g., picking agent, stowing agent, customer) may progress through the rows. For example, a user may progress through the rows 164, pick items from shelves of the inventory locations 162, and/or store items in shelves of the inventory locations 162.

Likewise, the storage area 130 may include one or more drop locations 166. A drop location, as described in further detail below, may be a single purpose or multiple purpose location within the materials handling facility storage area. For example, a single purpose drop location may be configured to only receive items that have been picked from inventory locations 162 within the materials handling facility. A multiple purpose drop location may be configured to receive items that have been picked from inventory locations 162 and provide other features for users. For example, a multiple purpose drop location may be configured for use in weighing items, sealing items in a storage container (e.g., plastic wrap, vacuum bag), etc. Drop locations 166 may be distributed throughout the storage areas 130 to provide accessible locations for users to place items that they have previously picked but no longer desire. As discussed further below with respect to FIG. 2, a drop location may include multiple input (e.g., cameras, load cells, pressure sensors, microphones, dimensioning system) and/or output components (e.g., displays, speakers, haptic output) for use in identifying a user that places an item at the drop location as well as identifying a placed item.

In various implementations, any number of storage areas 130 may be located throughout a given materials handling facility. Such storage areas 130 may be located on different floors.

Also illustrated in FIG. 1B is a transition area 140. The transition area may include one or more return locations 168. A return location 168, as described in further detail below, may be configured to receive items that are to be returned and/or provide user support for the return of items. For example, the return location 168 may include multiple input (e.g., cameras, load cells, pressure sensors, microphones, dimensioning system) and/or output components (e.g., displays, speakers, haptic output) that can be used to identify the user and the item to be returned.

Return locations may be distributed throughout the transition area 140 to provide accessible locations for users to return items that they have previously transitioned from the materials handling facility and/or from another source. In various implementations, any number of transition areas 140 may be located throughout a given materials handling facility.

A drop location and a return location are commonly referred to herein as an "item release location" because the structural configuration of the return location and the drop location may be similar, as discussed below with respect to FIG. 2. The differences between a drop location and a return location are the configured purpose, use and location of the drop location or the return location. For example, a drop location is configured to receive items that have been picked from an inventory location within a materials handling facility but have not yet been transitioned. A user my place a picked item at the drop location to have the item removed from an item identifier list associated with the user and so that the item can be transitioned back to storage. As such, a drop location is typically located in the storage area of a materials handling facility.

In comparison, a return location is configured to receive items that have been transitioned (e.g., purchased, leased, borrowed, rented) from the materials handling facility or an associate. A user may place an item at a return location to initiate a return of the item. As such, a drop location is typically located at a transition area of the materials handling facility.

The inventory management system 150 may be implemented on one or more computing resources. The computing resources may be local and/or remote. As illustrated, the inventory management system 150 is implemented on remote computing resources 103, which may include one or more servers 103(1), 103(2)-103(N) and may, in some instances, form a portion of a network-accessible computing platform implemented as a computing infrastructure of processors, storage, software, data access, etc. The computing resources 103 do not require end-user knowledge of the physical location and configuration of the system that delivers the services. Common expressions associated for the remote server system 103 include "on-demand computing," "software as a service (SaaS)," "platform computing," "network-accessible platform," "cloud services," "data centers," and so forth.

The inventory management system 150 may utilize antennas or wired connections within the materials storage area 130 of the materials handling facility to create a local network (e.g., Wi-Fi) to communicate with the drop locations 166, the return locations 168 and/or other components and devices of the materials handling facility, such as, cameras, load cells, pressure sensors, speakers, microphones, RFID readers, etc. Likewise, in instances when one or more of the components of the inventory management system 150 are remote from the materials handling facility, those components may communicate with other components of the inventory management system 150 via a network, such as the Internet.

An RFID tag generally refers to a device with an antenna or resonator that can produce a wireless signal when activated or powered. The wireless signal produced by the RFID tag is typically low power, and intended for transmission over short distances. The RFID tag may be formed of any material and may be flexible or rigid. In some implementations, the RFID tag may include an adhesive on a portion of the exterior of an RFID tag surface to enable attachment of the tag to an item, such as an inventory item. For example, an RFID tag may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

The organization and operation of the storage area 130 within a materials handling facility described above is given as an example. In other implementations, a materials handling facility and/or storage area may be arranged differently and operate differently than described above.

Figure 2:
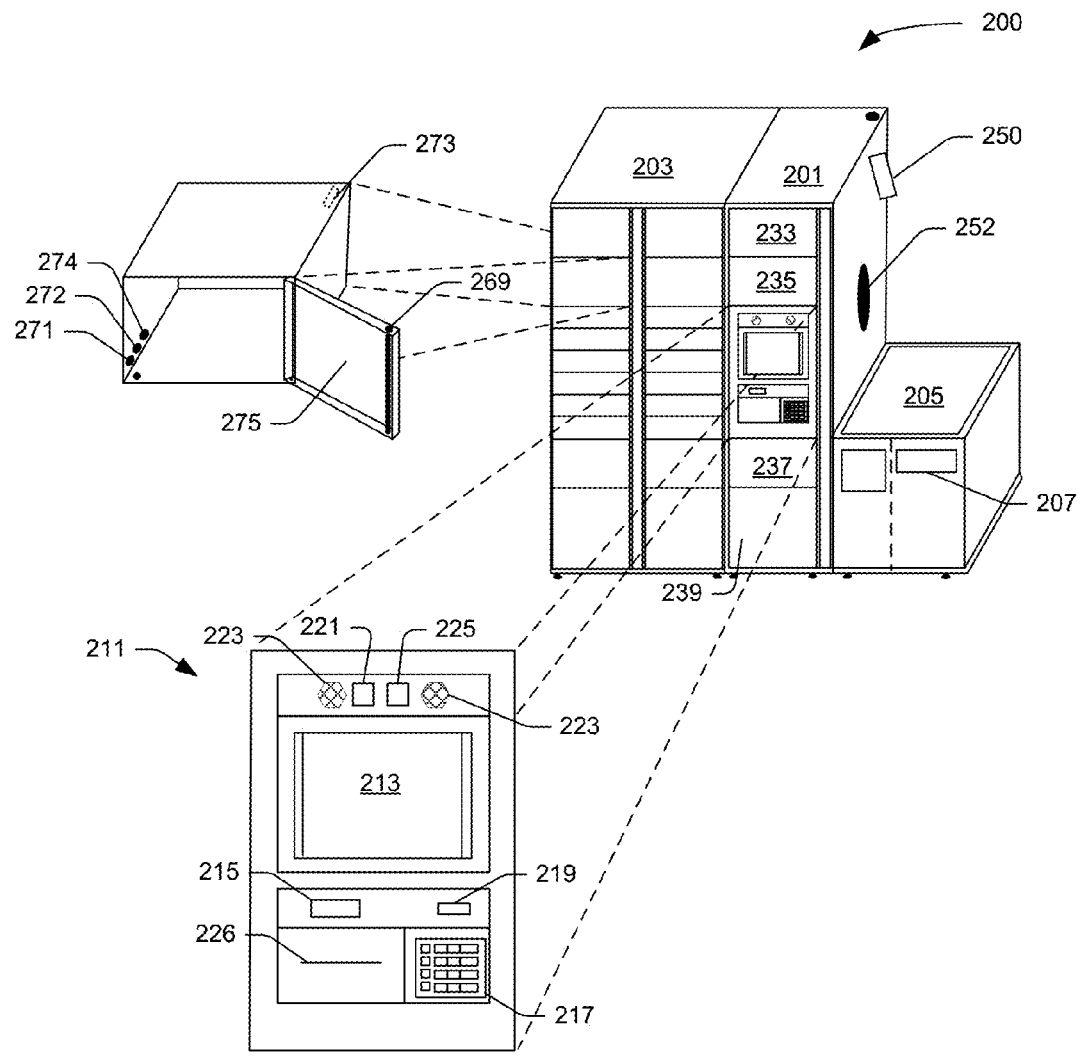
FIG. 2 is a diagram illustrating an example configuration of a drop location or a return location, according to an implementation.

FIG. 2 depicts an illustration of an item release location 200, according to an implementation, which may be utilized to provide the features and function of either a drop location or a return location, depending on where it is positioned within or with respect to the materials handling facility. Specifically, while a drop location and a return location may provide different features as functions, as described herein, the physical structure of the locations may be similar.

The item release location 200 may include one or more control stations 201, one or more storage compartment modules 203, one or more item placement shelves 205 and/or one or more deposit bins 207. The control station 201 acts as the central control point for the item release location 200, providing power, computing resources, user input and network access to the item release location 200. For example, control station 201 may include an internal computing system (not shown) that is capable of maintaining state information for each storage compartment at the item release location 200 as well as the items that have been placed or returned to the item release location 200, as well as providing other computing functions. For example, the internal computing system may include a command component that maintains information as to which storage compartments of the item release location 200 are empty, which storage compartments include items, etc. The command component may also issue commands or instructions to the storage compartment modules to lock/unlock storage compartments, activate sensors, and the like. The item release location 200 may be configured to obtain information from a remote computing resource 103, or material handling facility or may be configured to operate primarily as a stand-alone unit, with limited external communication to facilitate placement of items for return or removal from an item identifier list associated with a user.

The control station 201 may also include a user interface 211. The user interface 211 is configured to receive and provide information to one or more users of the item release location 200 and may include, but is not limited to, a display 213, such as a touch-screen display, a scanner 215, a keypad 217, a biometric scanner 219, an audio transducer 221 (e.g., microphone), one or more speakers 223, one or more image capture devices 225, such as a video camera, and any other types of input or output devices that may support interaction between the item release location 200 and one or more users.

In implementations in which the release location 200 is a return location, the user interface 211 may also include a credit card reader, and/or include the ability to accept and/or vend money (such as cash or coins) using a vending slot 226. Providing the ability for the return location to accept credit cards, accept and/or vend money allows the return location to allocate refunds/credits for returns to a user provided credit card or to provide cash for the refund. In other implementations, the return/or credit may be applied to a user account maintained by the inventory management system 150.

The control station 201 may also include a connector component configured to provide wired and/or wireless network connectivity with the other storage compartment modules 203, as well as to remote computing devices 103 (FIG. 1B) or a materials handling facility. Wireless connectivity may be implemented using a wireless antenna, which may provide both receive and transmit functionality. In addition, in some implementations, the control station 201 may include one or more storage compartments 233, 235, 237, 239. As described in more detail below with respect to the storage compartment modules 203, the storage compartments 233, 235, 237, 239 of the control station 201 may be of any size or configuration. As with each of the other storage compartments, the storage compartments 233, 235, 237, 239 of the control station 201 may include an automated locking mechanism, image capture device, a motion or presence detection mechanism, temperature sensor, etc. Alternatively, in some implementations, one or more of the storage compartments may be utilized as an additional user interface.

Each storage compartment module, such as storage compartment modules 203, may be configured so the item release location 200 is modular, such that one or more storage compartment modules can be easily removed or added to the control station 201 of the item release location 200. The ability to add or remove storage compartment modules at an item release location 200 supports the ability to easily and quickly expand or remove capacity so that the demand for that item release location can be satisfied. For example, during the Christmas holiday season and the weeks following, additional storage compartment modules may need to be added to the item release location 200 to support the increased demand of items placed at the item release location 200 for return (return location) or removal from an item identifier list associated with a user (drop location). As storage compartment modules 203 are added or removed from an item release location 200, the control station 201 informs the inventory management system 150 of the added or removed capacity.

Each storage compartment of a storage compartment module 203 or control station 201 includes an upper, bottom, side and rear surfaces and at least one door configured to form a cavity in which items may be stored. In addition, each storage compartment may include various security or other components. For example, looking at the expanded view of a storage compartment, disposed within the cavity the storage compartment may include a locking mechanism 269, which may be controlled remotely by the control station 201, a presence detection sensor 271, motion sensor 272, an image capture device 273, and/or a temperature sensor 274. The locking mechanism 269 may be controlled by the control station 201, either through wired or wireless communication, to effect locking and unlocking of the door 275 of the storage compartment. For example, when a user interacts with the control station 201 to return an item, the control station 201 may identify a specific storage compartment and may send instructions to the storage compartment to unlock. The instructions may include a command (e.g., unlock), an address or identifier of the specific storage compartment and any other information necessary for communication between the control station 201 and the storage compartment. In response to receiving the instructions, the storage compartment may activate a locking mechanism that moves the pins of the locking mechanism 269 on the door 275 of the identified storage compartment such that the pins retract, thereby disengaging the lock of the storage compartment allowing the door 275 to open. In some implementations, the storage compartment may also include a spring mechanism (not shown) such that when the locking mechanism 269 of the storage compartment is disengaged, the spring mechanism propels the door 275 outward, thereby identifying to a user that the door 275 is unlocked and the storage compartment is accessible.

While the locking mechanism described above utilizes retractable pins, any mechanical, magnetic, electrical or other form of locking mechanism may be utilized with the various implements described herein. In addition, the storage compartment may also include magnets to help retrieve and close a door when it is not all the way closed. Also, the locking mechanism of different storage compartments and different storage compartment modules may be the same or different.

The presence detection sensor 271 may be used to detect the presence or absence of objects in the storage compartment. For example, the presence detection sensor 271 may be utilized when a user is placing an item in the storage compartment to confirm that the item is indeed in the storage compartment before the door 275 is closed and locked by the locking mechanism 269.

In some implementations, there may be multiple presence detection sensors 271 and/or motion sensors 272 distributed throughout the inside of each storage compartment to ensure objects/motion is detected. In still another implementation, the bottom of the storage compartment may include protrusions or rises to position thin items so they are detected by the presence detection sensor 271.

The storage compartments may also include an image capture device 273, such as a camera, and optionally an illumination component (not shown), such as a light emitting diode (LED), that may be used to illuminate the inside of the storage compartment. The image capture device 273 may also be used to the detect presence or absence of items within the storage compartment, detect the item itself, provide image of the item for processing, as well as for security. For example, the image capture device 273 may be used to identify the item located within the storage compartment and/or to identify or record video/images of access with the storage compartment.

Some storage compartments, such as any of the storage compartments located within a storage compartment module 203 or the control station 201, may be refrigerated storage compartments. In various implementations, such refrigerated storage compartments may include their own cooling mechanisms, or may rely on those of neighboring refrigerated storage compartments to which they are environmentally coupled, or alternatively each of the modules or the entire item release location 200 may have a centralized cooling system. The temperature of previously non-refrigerated storage compartments may be adjusted to become refrigerated storage compartments, and visa-versa. The temperature in each of the refrigerated storage compartments may be separately adjustable, such that items inside each of the refrigerated storage compartments may be cooled to a desired temperature. For example, items that need to be chilled or frozen at specified temperatures, such as groceries or medical supplies, may be placed in various refrigerated storage compartments.

The temperatures in some or all of the refrigerated storage compartments may be controlled by the control station 201. Continuous monitoring and regulating of the temperatures of the refrigerated storage compartments in which items are placed may be important for verifying and/or maintaining the condition of the item when placed in the storage compartment. Temperature sensors, such as the temperature sensor 274 of the storage compartments, may be utilized for monitoring and regulating the temperature inside each of the refrigerated storage compartments. The refrigerated storage compartments and/or the entire item release location 200 may be insulated to prevent the dissipation of the cooled air from the refrigerated storage compartments.

In another example, the item release location 200 may also include one or more storage compartment modules configured as a deposit bin 207, which may or may not be refrigerated. Rather than utilizing specific storage compartments of the item release location 200 to store placed items, a storage compartment module configured as a deposit bin 207 may be utilized to securely store such items. For example, a deposit bin may be configured with a pivoting door or tray that allows items to be placed into the deposit bin 207 but not retrieved without having additional access to the deposit bin 207. In some examples, the pivoting door or other form of access may be of a particular size to limit the types of items placed into the deposit bin.

The item release location may also include one or more item placement shelves 205, which may include a load cell, pressure sensor, scale or other component for determining the size, shape and/or weight of the item. Positioned around the item placement shelf 205 may be other input components configured for identifying a placed item. For example, one or more a cameras 250 may be positioned to capture images of an item placed on the item placement shelf 205 and/or images of the user placing the item on the item placement shelf 205. An RFID reader 252 may also be positioned adjacent the item placement shelf 205 and configured to detect the presence of an RFID tag located on an item placed on the item placement shelf 205. An item dimensioning system (not shown), such as a CubiScan 110 item dimensioning system, offered by Quantronix, Inc., which can be used to determine the shape, size and/or dimensions of an item placed on the item placement shelf 205.

Figure 3:
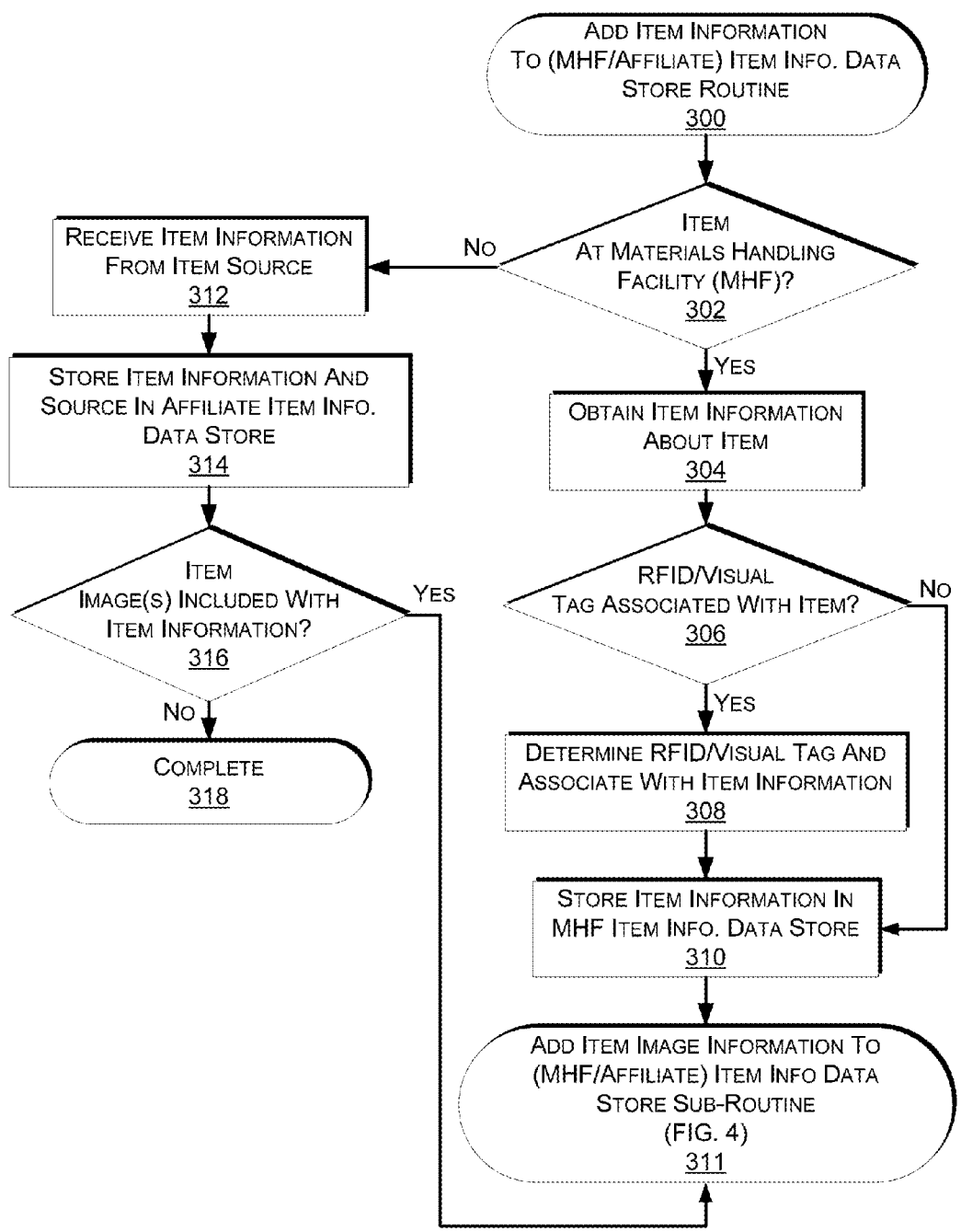
FIG. 3 depicts a flow diagram of an example add item information to a materials handling facility item information data store or affiliate item information data store routine, according to an implementation.

FIG. 3 depicts a flow diagram of an example routine for adding item information to either a materials handling facility item information data store or an affiliate item information data store, according to an implementation. The routine of FIG. 3 and each of the other routines discussed herein may be implemented in hardware, software, or a combination thereof. In the context of software, the described operations represent computer-executable instructions stored on one or more computer-readable media that, when executed by the one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example routine 300 begins by determining if the item to be added to the item information data store is located at the materials handling facility, as in 302. As discussed herein, the implementations may be used to facilitate returns of items obtained from the materials handling facility at which the return location is located and/or from an affiliate of the materials handling facility. An affiliate of the materials handling facility may be, for example, another materials handling facility under the same operation or control as the materials handling facility, an e-commerce website that communicates with the inventory management system and/or another third party that communicates with the inventory management system 150. For example, an affiliate may provide item information (RFID tag identifier, images, visual tag identifier, etc.) for use in identifying items returned by a user at a return location.

If it is determined that the item is at the materials handling facility, item information about the item is obtained, as in 304. Item information may include any information about an item, such as, the items size, shape, weight, color, expiration date, price, ingredients, warnings, origin, etc. In one implementation, the item information is provided by a materials handling facility employee (user) during receive of the item into the materials handling facility.

A determination may also be made as part of obtaining the item identification as to whether an active and/or visual tag is associated with the item, as in 306. A visual tag, as used herein, is any visually detectable identifier that can be used to identify the item. For example, a visual tag may be a barcode, bokode, watermark, color, character, symbol, etc.

If an RFID tag and/or a visual tag is included on or in the item, the RFID tag identifier and/or visual tag identifier is determined and associated with the item information, as in 308. Likewise, the item information and optionally the RFID tag identifier and/or visual tag identifier is stored in the materials handling facility item information data store 1315 (FIG. 13), as in 310. In addition to storing the item information, item image information may be determined and stored, as in 311, and as discussed below with respect to FIG. 4.

Returning to decision block 302, if it is determined that the item is not at the materials handling facility, the item information is received from the source of the item, as in 312. The source of the item is the seller or provider of the item that communicates with the inventory management system to facilitate a return of the item via a return location located at the materials handling facility. The received item identification information and an identification of the item source is stored in the affiliate item information data store 1319 (FIG. 13), as in 314. In some implementations, a minimum set of item information may be required to facilitate item returns on behalf of an affiliate at a return location. For example, the minimum set of information may include the item size, shape, weight, and price. Likewise, return parameters may also be specified for the item and/or the affiliate. For example, the affiliate may specify their return period for purchased items (e.g., thirty days). In some implementations, an affiliate may periodically provide purchase information to the inventory management system to aid the identification and facilitation of an item return at the inventory location.

In addition to storing item information and a source identifier, a determination may also be made as to whether item images are included in the item information provided by the affiliate, as in 316. If item images are not provided by the affiliate, the example routine 300 completes, as in 318. However, if there are included item images, the add item images information to affiliate item information data store sub-routine is performed, as in 311, and discussed below with respect to FIG. 4.

Figure 4:
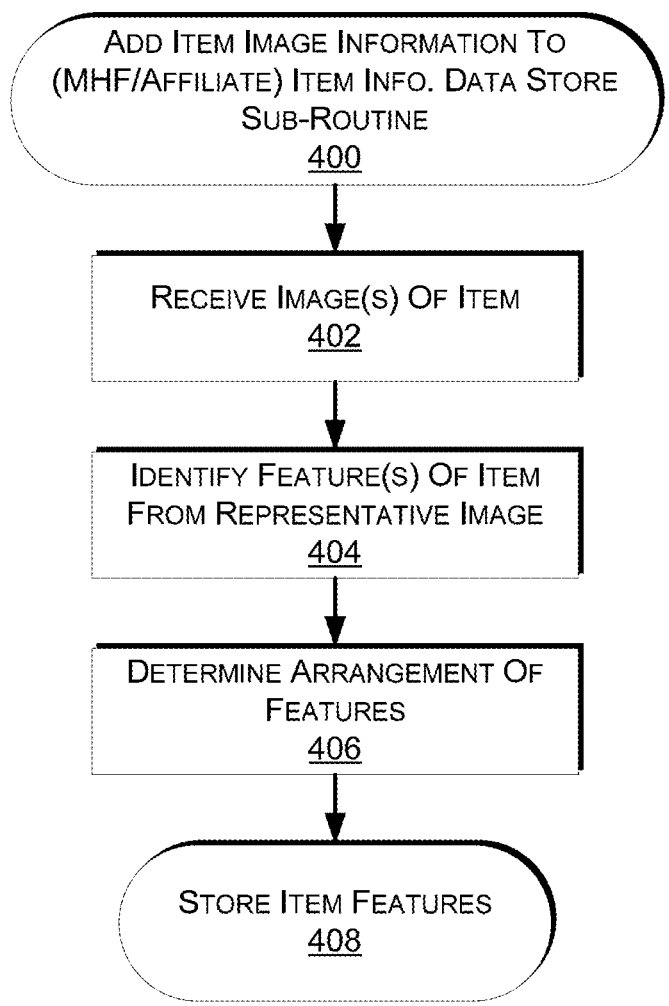
FIG. 4 depicts a flow diagram of an example add item image information to a materials handling facility item information data store or affiliate item information data store sub-routine, according to an implementation.

FIG. 4 depicts a flow diagram of an example sub-routine 400 for adding item image information to either a materials handling facility item information data store or an affiliate item information data store, according to an implementation. The example sub-routine 400 begins when images of an item are received for use in adding item image information to either a materials handling facility item information data store or an affiliate item information data store, as in 402. For example, when a new item is received into a materials handling facility at the receiving area 120, in addition to determining and storing item information (FIG. 3) images of the item may be captured and provided to the example sub-routine 400. For example, a receiving agent may scan a bar code or other identifier to identify the item that is being received. During receive, one or more images of the item(s) may be captured. In some implementations, the capturing of images may be performed at different stages of the receive process. For example, if the items are being segmented or otherwise separated for storage in the storage area, images may be captured as the items are separated. In other implementations, images may be captured when the items have completed receive but before they are placed into a storage area. In some implementations, images of an item may be captured in a controlled environment such that the images are taken from a known distance, pan, tilt, zoom and lighting conditions.

In another example, if the item source is an affiliate, the image may be included in the item information provided by the affiliate.

Regardless of when and/or how the images are captured or obtained, a representative image for the item is selected and processed to identify features of the item, as in 404. A representative image may be any image of the item. For example, the representative image may be the frontal view of the item, a side view of the item, a back view of the item, etc. The representative image is processed to identify features of an item in the image. In some implementations, the image may be processed in grey-scale to identify features. Features of an item may be anything or a combination of things that are identifiable for that item. For example, a feature may be the shape of the item, a color of the item, the label or logo on the item, the wording on the item, a symbol on the item, a character on the item, a word on the item, a number on the item, a texture of the item, a gradient of the item, a reflectivity of the item, an edge of the item, and the like. For example, "Organic Dressing" identified on a label positioned on a tall slender bottle may be a feature. In some implementations, character recognition may be utilized to identify characters or words included in the image. Once the features of the item represented in the image are identified, an arrangement of the features is determined, as in 406. The arrangement of features in the image may be determined with respect to other features. For example, if the image is processed in two-dimensions, the location of the identified features may be associated with an X-Y position on the two-dimensional grid overlaid on the image. The arrangement may be a two dimensional relationship of the features with respect to each other as captured in the representative image. In other implementations, the arrangement of features may be a three-dimensional arrangement with respect to each other as captured in the representative image.

The image features and the corresponding arrangement are then stored in either the materials handling facility item information data store or the affiliate item information data store along with the corresponding item information, as in 408. The stored item image information may include an image of the item, the features obtained from the image of the item, the arrangement of features, the date/time that the image was captured, the location within the materials handling facility (or other location) where the image was captured, a boundary of the item within the image, the pan-tilt-zoom of the image capture device that captured the image, the hardware information for the image capture device that captured the image, an identifier identifying the image capture device, the identity of the associated item, the item type, and the like.

In some implementations, if information is presented to the user from the inventory management system 150, such information may be presented through a display of the drop location or a return location and/or other output devices positioned within the materials handling facility.

Figure 5:
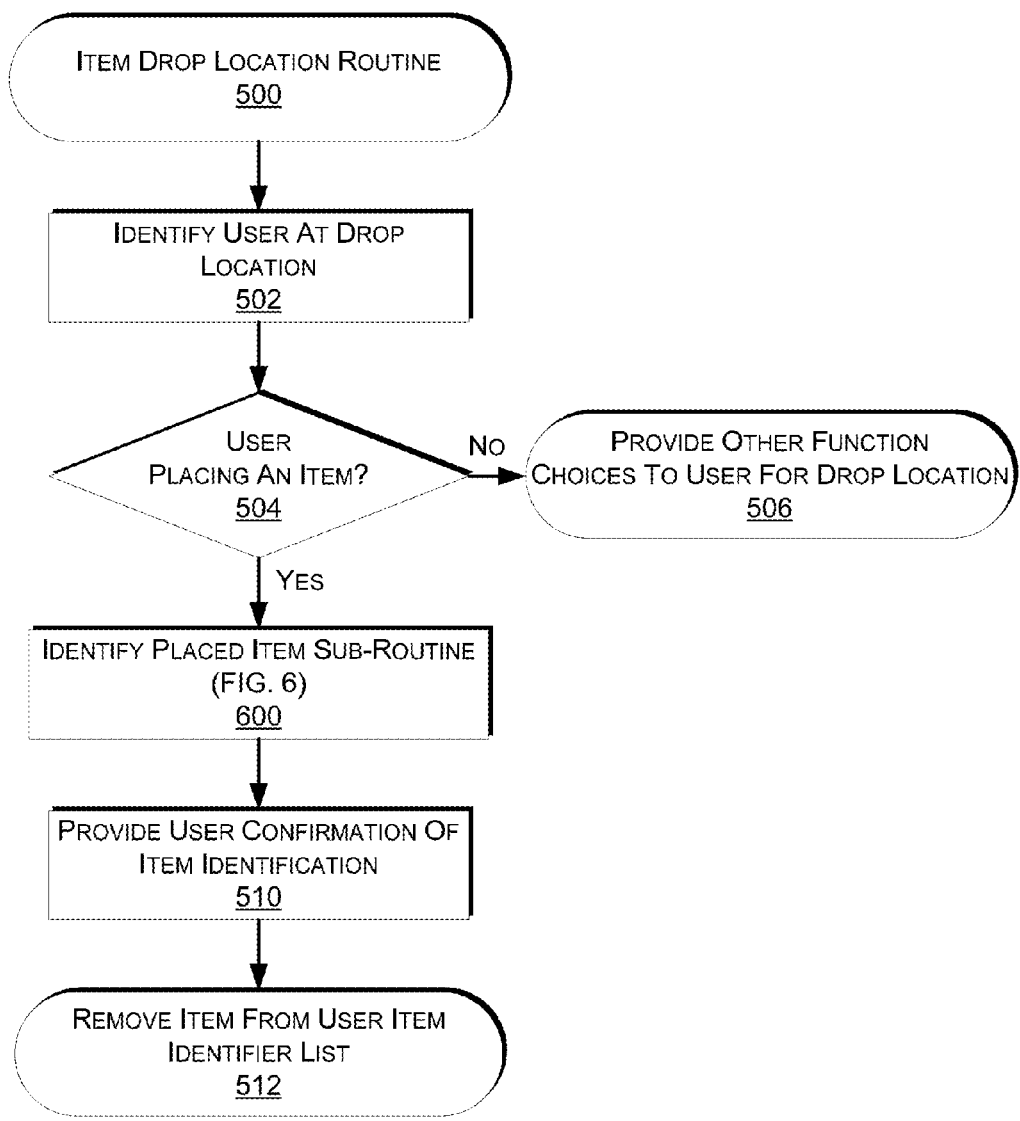
FIG. 5 depicts a flow diagram of an item drop location routine, according to an implementation.

FIG. 5 depicts a flow diagram of an example item drop location routine 500, according to an implementation. The example routine begins by identifying a user at a drop location, as in 502. A variety of techniques may be utilized, alone or in combination, to identify a user. For example, a user may be identified as they enter the materials handling facility using facial recognition, biometrics, user provided information, RFID tags, visual tags, etc. The location of the user may be monitored as the user moves through the materials handling facility and thus, when the user approaches the drop location, the user is already known. In another example, one or more images of the user may be captured by one or more image capture devices located at or near the drop location and processed to determine the identity of the user. Again, this may be accomplished using facial and/or object recognition. As still another example, the user may identify themselves at the drop location by providing biometrics via the biometric scanner 219, providing a user identifier and password via the user interface 211, etc.

The example routine 500 also determines whether the user is placing an item with intent to have the item removed from the item identifier list associated with the user, as in 504. If the drop location is a single purpose drop location, decision block 504 may be omitted. However, if the drop location is a multiple purpose drop location, the decision block 504 may be performed. For example, the user may interact with the drop location user interface 211 to identify whether they want to place an item to have it removed from the item identifier list associated the user or perform another function offered by the multiple purpose drop location. Alternatively, or in addition thereto, images of the user and/or items carried by the user as they approach the drop location may be captured and processed to assist in determining the intent of the user.

If it is determined that the user is interested in another function of the drop location, other function choices are provided to the user for selection, as in 506. However, if the user is placing an item at a drop location (e.g., the item placement shelf 205) with the intent of having the item removed from the item identifier associated with the user, the item identification at drop location sub-routine 600 is performed to identify the placed item, as discussed below with respect to FIG. 6.

The item identification at drop location sub-routine 600 returns an identification of the placed item and the example routine 500 provides a confirmation to the user that the placed item has been identified, as in 510. For example, item information representative of the item may be presented to the user on the user interface 211 and/or a portable device associated with the user may be updated to identify that the placed item has been removed from the item identifier list associated with the user that placed the item.

In addition to notifying the user that the item has been identified, the item identifier representative of the placed item is removed from the item identifier list associated with the user, as in 512. In some implementations, a notification may be provided to the user to transfer the placed item into a storage compartment and/or the item deposit bin 207.

Figure 6:
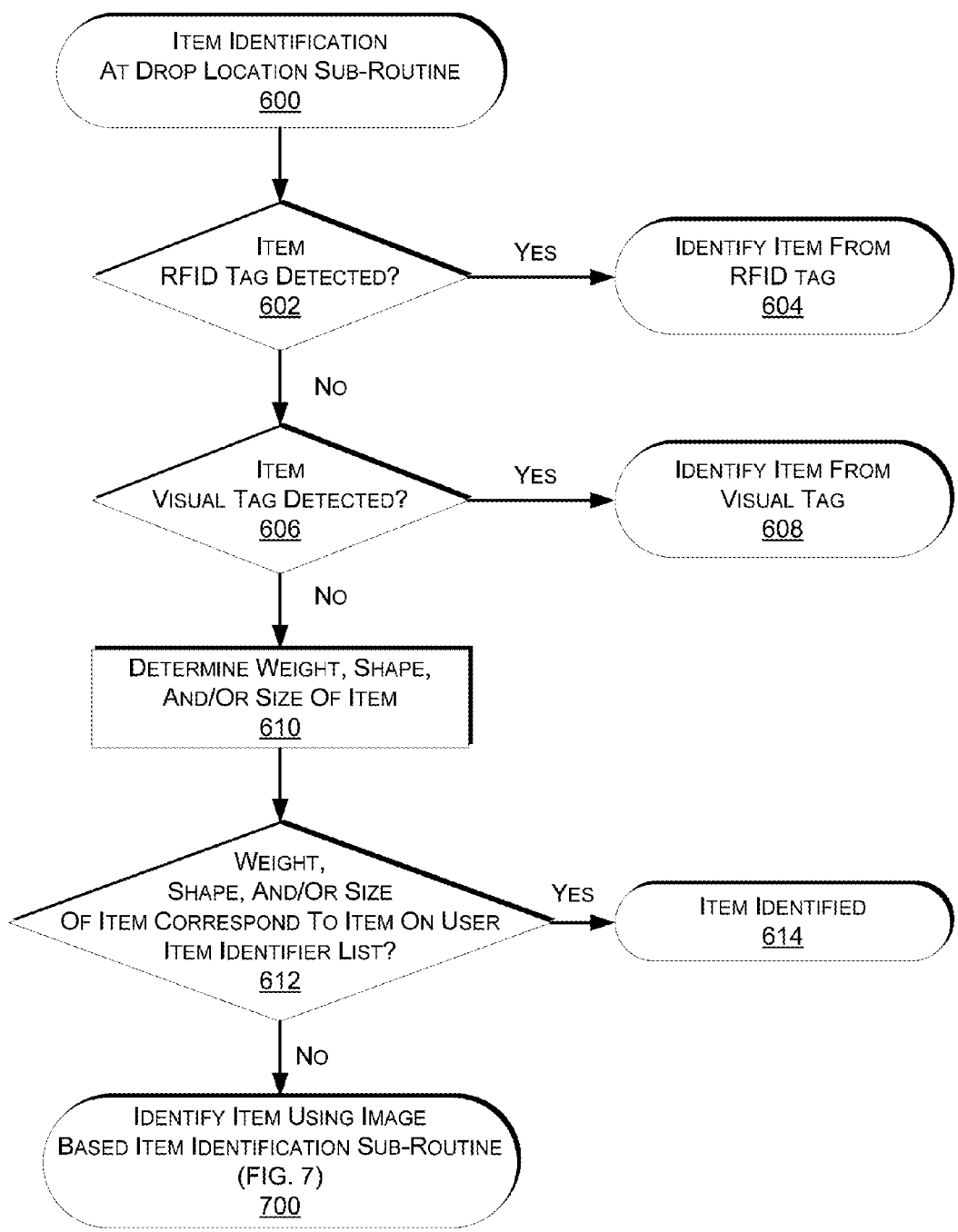
FIG. 6 depicts a flow diagram of an example routine for identifying an item at a drop location, according to an implementation.

FIG. 6 depicts a flow diagram of an example sub-routine 600 for identifying items at a drop location, according to an implementation. The example sub-routine 600 beings by determining if an RFID tag is detected on the placed item, as in 602. As discussed above, the drop location may include or be adjacent to an RFID reader that can scan for an RFID tag located on the placed item. If it is determined that an RFID tag is detected on the placed item, the corresponding RFID tag identifier is utilized to identify the item and obtain the corresponding item information from the materials handling facility item information data store 1315, as in 604.

If it is determined that no RFID tag is detected, a determination is made as to whether a visual tag is detected on the placed item, as in 606. As discussed above, the drop location may include or be adjacent to one or more image capture devise (e.g., cameras, bar code reader) that can capture images and/or scan the placed item to determine if the placed item includes a visual tag. If it is determined that the placed item includes a visual tag, the corresponding visual tag identifier is utilized to identify the item and obtain the corresponding item information from the materials handling facility item information data store 1315, as in 608.

If it is determined that no visual tag is detected, the weight, shape and/or size of the item is determined, as in 610. As discussed above, the return location may include a variety of input components, such as a load cell, pressure sensor, scale, camera, dimensioning system, etc. A load cell, pressure sensor, etc. may be utilized to determine a weight of the placed item. Likewise, the load cell, pressure sensor, etc., may be configured to determine the overall shape of a base of the item when placed on the return location. For example, the sensor may be an Interpolating Force-Sensitive Resistance (IFSR) sensor that can detect contact at multiple points on the sensor. As another example, the drop location may include a dimensioning system (e.g., CubiScan 110) that can scan the placed item and determine the overall dimensions (e.g., size, shape) of the item.

Because drop locations are positioned within the materials handling facility and configured to receive items that were picked by a user but have not been transitioned from the materials handling facility, rather than attempting to identify the item from all items identified in the materials handling facility item information data store, a subset of items may be selected for consideration in identifying the item. For example, upon user identification, only items included on the item identifier list associated with the user need be considered as those are the only items picked by the user and potentially being placed by the user at the drop location.

Utilizing the determined weight, shape and/or size of the placed item a determination is made as to whether the placed item corresponds to an item identified on the item identifier list associated with the user, as in 612. For example, one or more of the determined weight, shape and/or size of the placed item may be compared with item information maintained in the materials handling facility item information data store for items included on the item identifier list associated with the user. If it is determined at decision block 612 that the weight, size and/or shape of the placed item corresponds with the item information for one of the items identified on the item identifier list associated with the user, the item is identified, as in 614 and the determined item identifier is returned. However, if it is determined that the weight, shape and/or size of the placed item does not correspond with an item identifier on the item identifier list associated with the user, the item is identified using the image based item identification sub-routine 700, as discussed below with respect to FIG. 7.

Figure 7:
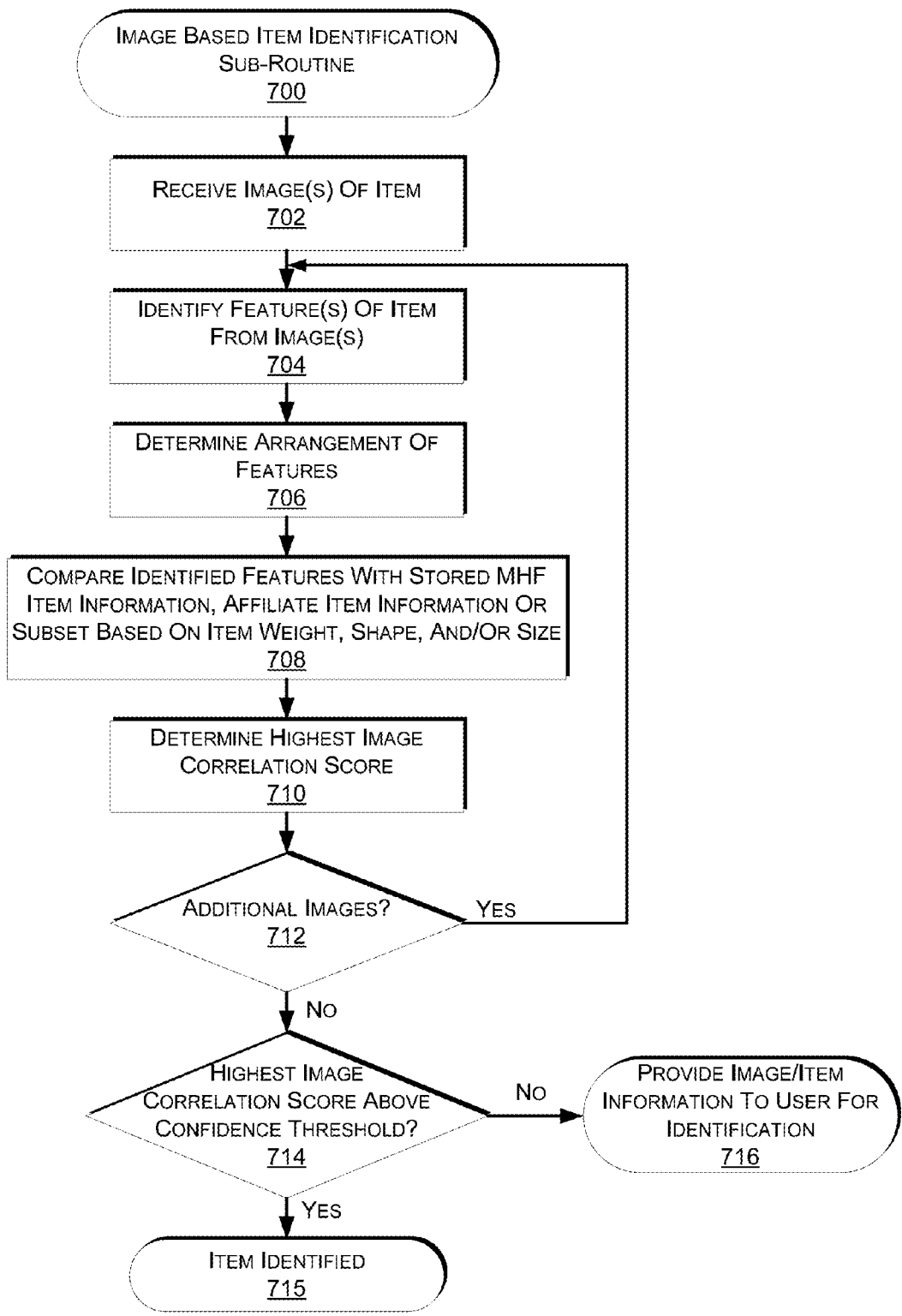
FIG. 7 depicts a flow diagram of an example image based item identification sub-routine, according to an implementation.

FIG. 7 depicts a flow diagram of an example image based item identification sub-routine 700, according to an implementation. The example sub-routine 700 begins upon receipt of one or more captured images of an item, as in 702. A received image is processed to identify features of an item in the image, as in 704. In some implementations, the image may be processed in grey-scale to identify features. Features of an item may be anything or combination of things that are identifiable for that item. For example, a feature may be the shape of the item, a color of the item, the label or logo on the item, the wording on the item, a symbol on the item, a character on the item, a word on the item, a number on the item, a texture of the item, a gradient of the item, a shape of the item, a reflectivity of the item, an edge of the item, and the like. For example, "Organic Dressing" identified on a label positioned on a tall slender bottle may be a feature. As will be appreciated, depending on the orientation of the item when the image is captured, different features may be identified. As such, each image of an item may include multiple, and/or different features.

An arrangement of the identified features may then be determined, as in 706. The arrangement may be a two dimensional relationship of the features with respect to each other as captured in the image. In other implementations, the arrangement of features may be a three-dimensional arrangement with respect to each other as captured in the image.

The arrangement of the identified features is then compared with item image information stored in either the materials handling facility item information data store or the affiliate item information data store, as in 708. As discussed above, the item image information stored in the materials handling facility item information data store and the affiliate item information data store includes arrangements of features for images that have previously been identified and associated with the item.

A captured image may be processed to identify features, determine the arrangement of those features and that arrangement of features may be compared with the arrangement of features stored as part of the item image information for previously captured images of items. For example, an image matching algorithm, such as Scale-Invariant Feature Transformation (SIFT), Principal Component Analysis (PCA)-SIFT, or Speeded Up Robust Features (SURF), and/or Image Match algorithms may be utilized alone or in combination to compare the arrangement of features of the processed image with the stored item image information to determine the correlation of the feature arrangements. In one implementation, each inventory item may have multiple images and corresponding item image information associated therewith that is maintained in either the materials handling facility item information data store or the affiliate item information data store. When an image of a placed item is received and processed, the arrangement of the identified features may be compared with one or more of the stored item image information for one or more of the inventory items to determine how well the item image information for the captured image compares with stored item image information, and a correlation score determined.

The correlation scores identify how similar the arrangement of features identified from the processed image is to the arrangement of features included in each of the stored item image information.

After processing the image and determining correlation scores, a determination is made as to whether there are additional images to process, as in 712. If it is determined that there are additional images to process, the example sub-routine 700 returns to block 704 and continues. If there are no additional images to process, the example sub-routine 700 determines if the highest image correlation score is above a confidence threshold, as in 714. In some implementations, the correlation score from multiple images may be combined to generate a correlation score. For example, multiple images of an item may be captured and even though individual image correlation scores for those images may not satisfy the confidence threshold, if there are multiple images that have a correlation score that is near the confidence threshold, the collective may provide enough confidence that the item can be identified. As another example, if three images of an item are captured and two of those images return a correlation score that exceeds the confidence threshold but the third does not, it may still be determined that the item is identifiable based on the two images that exceed the confidence threshold.

If the correlation score exceeds the confidence threshold, the item is identified and the item identification returned, as in 715. However, if it is determined that correlation score does not exceed the confidence threshold, the image of the item, determined item information (e.g., weight, shape, size) and user information (e.g., item identifier list in the case of a drop location or user purchase history in the case of a return location) is provided to a user for manual item identification, as in 716. For example, a user may be an agent of the materials handling facility that receives the images of the placed item and addition information and manually identifies the item. Alternatively, the user may be the user that placed the item at the item release location.

Figure 8:
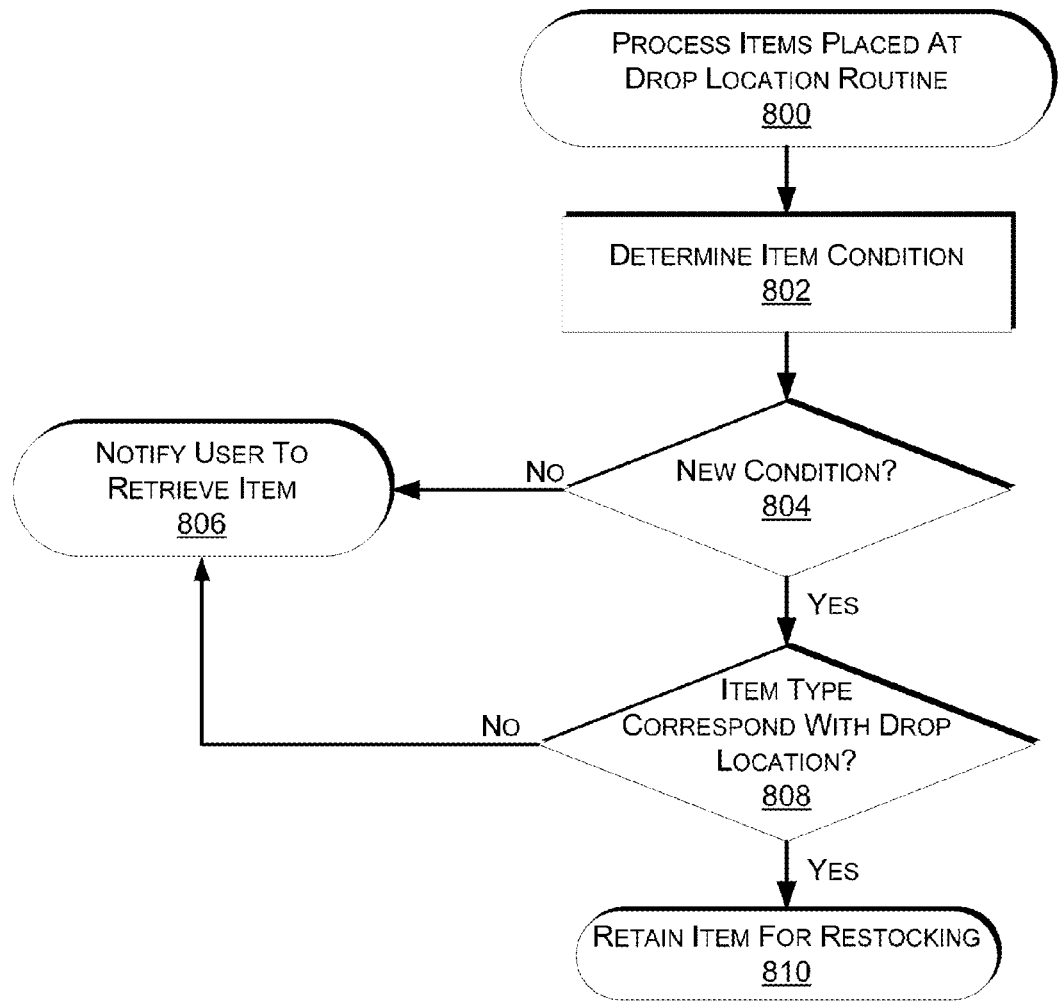
FIG. 8 depicts an example routine for processing items placed at a drop location, according to an implementation.

FIG. 8 depicts a flow diagram of an example routine 800 for processing items placed at a drop location, according to an implementation. The example routine 800 begins by determining a condition of the item, as in 802. The condition of the item may be determined by processing one or more images of the item that were captured when the item was placed at the drop location and/or from images of the item when stored in a storage compartment of the drop location. For example, similar to the techniques for identifying the item using image comparison, as discussed above with respect to FIG. 7, images of the placed item may be compared to stored item image information for the item to determine if the item has been opened, damaged, partially used, etc. For example, if the item is a banana, the color of the item placed at the drop location may be compared to stored images of bananas to determine if the item is damaged (e.g., bruised). As another example, if the item is a carton of milk, images of the placed item may be compared with stored images of a carton of milk to determine if the carton has been opened by, for example, determining if a portion of the contents are missing and/or if the top is missing/open.

At decision block 804, based on the determined item condition, a determination is made as to whether the item is in a new condition. If it is determined that the item is not in a new condition, a user is notified to retrieve the item from the drop location, as in 806. For example, a user (e.g., agent of the materials handling facility) may be instructed to remove the item from the drop location and dispose of the item because it cannot be placed back into the stored area as inventory. Alternatively, or in addition thereto, the user that placed the item may receive a notification or instruction to place the item into a storage compartment of the item release location. For example, the example routine 800 may select a storage compartment, cause the door of the storage compartment to open and present instructions to the user (e.g., via a display) to place the item in the opened storage compartment.

If it is determined that the item condition is new, a determination is made as to whether the item type corresponds with the drop location at which the item was dropped, as in 808. For example, some drop locations may be designated for particular types of items (e.g., chemicals, automobile, food, detergent) and some types of items may be incompatible with other types. For example, if the drop location is designated for receiving chemical items it will be determined that an item of fruit placed at the drop location does not correspond with the item type of the drop location.

If it is determined that the placed item does not correspond with the item type of the drop location, a user (e.g., agent of the materials handling facility) is instructed to retrieve the item from the materials handling facility, as in 806. In instances where the item does not correspond with the item type of the drop location, an additional determination may be made as to whether the item can be returned to the storage area or if it is to be disposed (e.g., the item is contaminated). Alternatively, or in addition thereto, storage compartments at the drop location may be utilized to separate items of different types. For example, the user that placed the item may receive a notification or instruction to place the item into a storage compartment of the item drop location. For example, the example routine 800 may select a storage compartment, cause the door of the storage compartment to open and present instructions to the user (e.g., via a display) to place the item in the opened storage compartment.

Finally, if it is determined that the placed item does correspond with the item type of the drop location, the item is retained for restocking back into the storage area, as in 810. For example, the user that placed the item may receive a notification or instruction to place the item into a storage compartment of the item release location. For example, the example routine 800 may select a storage compartment, cause the door of the storage compartment to open and present instructions to the user (e.g., via a display) to place the item in the opened storage compartment.

The drop location may be periodically emptied and the contents may be placed back into the storage area for subsequent picking by other users. In other implementations, each time an item is retained for restocking, a user may be instructed to retrieve the item and restock the item back into the storage area.

Figure 9:
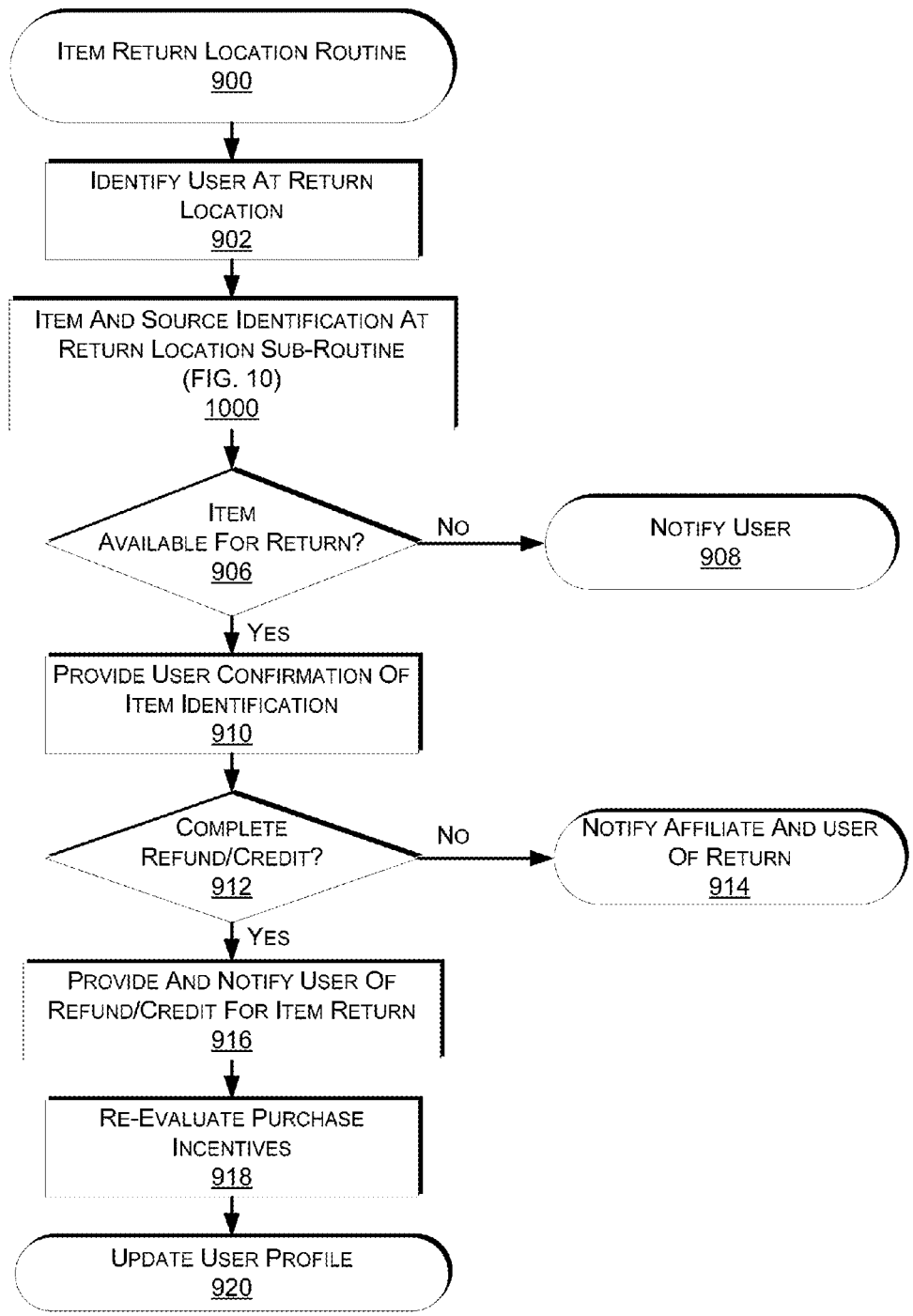
FIG. 9 depicts an example item return location routine, according to an implementation.

FIG. 9 depicts a flow diagram of an example item return location routine 900, according to an implementation. The example routine 900 begins by identifying a user at a return location, as in 902. As discussed above, a variety of techniques may be utilized, alone or in combination, to identify a user. For example, a user may be identified as they enter the materials handling facility using facial recognition, biometrics, user provided information, RFID tags, visual tags, etc. The location of the user may be monitored as the user moves through the materials handling facility and thus, when the user approaches the return location, the user is already known. In another example, one or more images of the user may be captured by one or more image capture devices located at or near the return location and processed to determine the identity of the user. Again, this may be accomplished using facial and/or object recognition. As still another example, the user may identify themselves at the return location by providing biometrics via the biometric scanner 219, providing a user identifier and password via the user interface 211, etc.

Upon identifying the user, the item placed at the return location for return by the user is identified, along with the source of the item, using the item and source identification at return location sub-routine 1000, as discussed below with respect to FIG. 10.

Upon identifying the source and the identity of the item, a determination is made as to whether the item is available for return, as in 906. Availability for return may be based on multiple factors and depend on the source of the item. For example, the source of the item may specify the period of time within which an item may be available for return. A condition of the item (e.g., new, used, damaged) may also be a condition for determining if the item is available for return. Likewise, the item type may determine whether the item is available for return. For example, if the item is software, it may be determined that the item cannot be returned once opened. Finally, if the source of the item cannot be identified, it may be determined that the item is not available for return.

If it is determined that the item is not available for return, the user is notified that the item cannot be returned at the return location, as in 908. For example, a notification may be presented on the user interface 211 of the return location that the item cannot be returned. Alternatively, or in addition thereto, a user (e.g., materials handling facility agent) may be instructed to assist the user.

If the item is available for return, a notification may be provided to the user that the item and the source of the item have been identified and that the item is available for return, as in 910. The notification may include the parameters of the return. For example, the parameters of the return may identify the amount of any refund or credit for the item, how the refund or credit will be applied, whether the refund or credit is immediate, etc.

As part of the return, a determination may also be made as to whether the refund or credit is to be completed, as in 912. For example, if the source of the item being returned is the materials handling facility, another materials handling facility that is commonly owned or controlled, or an e-commerce website that is commonly owned or controlled, the refund and/or credit may be completed and immediately provided to the user. Likewise, in some implementations, some other affiliates may have arrangements with the materials handling facility to allow the materials handling facility to complete a refund or credit on the affiliate's behalf. In other implementations, the affiliate may provide the refund or credit and thus the refund or credit may not be completed as part of the example routine 900. Likewise, if the item being returned was leased, rented, borrowed, etc., the refund or credit may be the confirmation that the item has been returned.

If it is determined that the refund or credit is not to be completed as part of the example sub-routine 700, the user and the affiliate are notified that the item has been returned and that the affiliate will complete the refund or credit for the item, as in 914. If it is determined that the refund or credit is to be completed, the refund or credit is provided to the user and a notification is provided to inform the user that the refund or credit has been applied, as in 916. The refund or credit may be a credit for use in the materials handling facility, a credit to a payment instrument (e.g., credit card, debit card) of the user, a cash refund, an acknowledgment that a rental, lease, borrowed item has been returned, etc.

In addition to completing the refund or credit, purchase incentives provided to the user may be re-evaluated, as in 918. For example, if an incentive was provided to the user at the time of the item purchase (item transition) that was based on the purchase of the item (e.g., buy one, get one free; discount on purchases over a defined valued; etc.) the purchase incentive may be re-evaluated and updated accordingly.

Finally, the user profile for the user may be updated to identify that the item has been returned, as in 920. In some implementations, a notification may be provided to the user to transfer the item from the item placement shelf of the return location to a storage compartment or item deposit bin of the return location.

Figure 10:
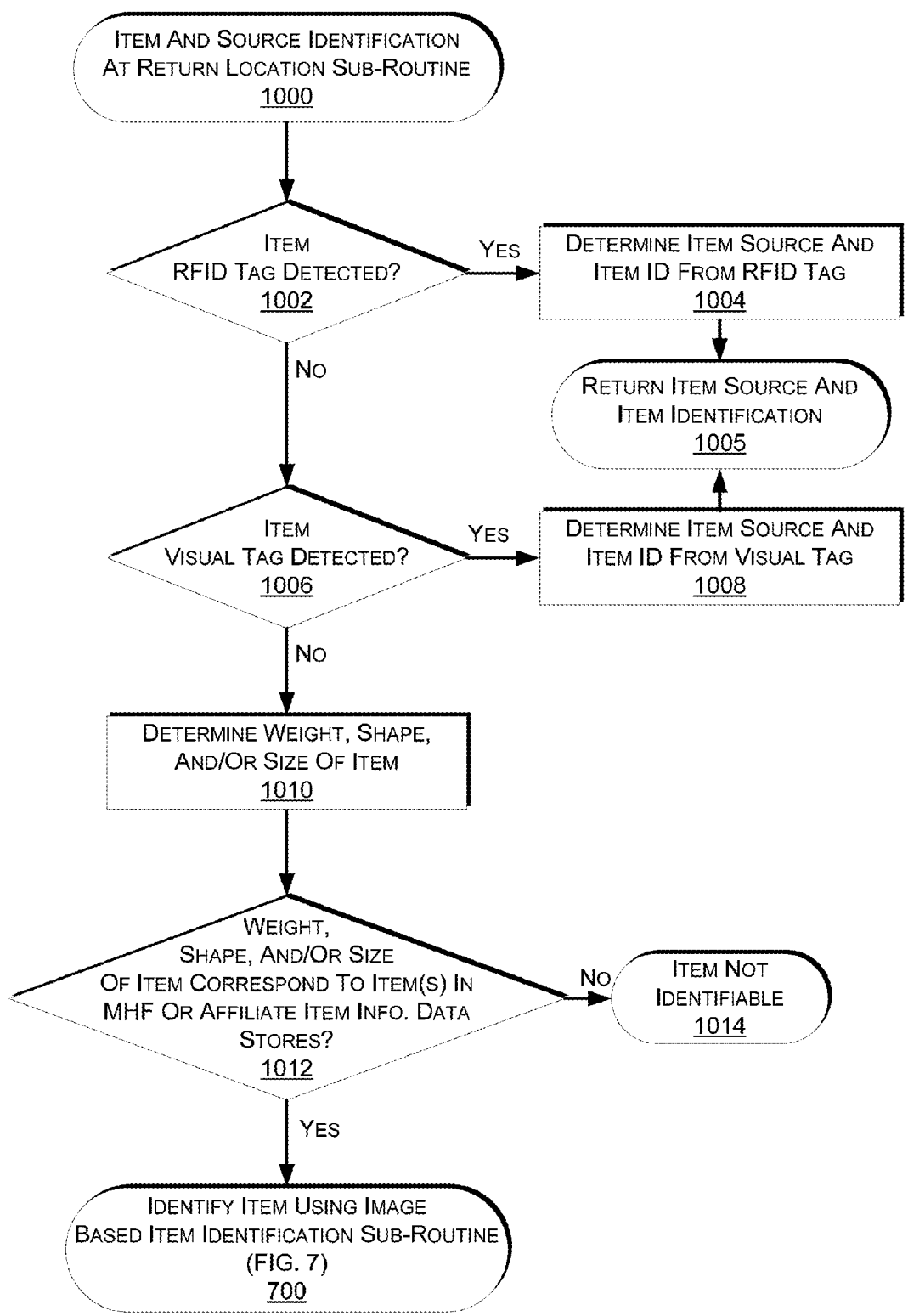
FIG. 10 depicts an example item identification at return location routine, according to an implementation.

FIG. 10 depicts a flow diagram of an example sub-routine 1000 for identifying items at a drop location and the source of the item, according to an implementation. The example sub-routine 1000 beings by determining if an RFID tag is detected on the placed item, as in 1002. As discussed above, the return location may include or be adjacent to an RFID reader that can scan for an RFID tag located on the placed item. If it is determined that an RFID tag is detected on the placed item, the corresponding RFID tag identifier is utilized to identify the item and obtain the corresponding item information from either the materials handling facility item information data store 1315 or the affiliate item information data store, as in 1004. The item information also includes the source of the item. The determined item identification and the source of the item are returned, as in 1005.

In some implementations, an RFID tag may be detected but the information from the RFID tag may not be discernible. For example, if the item is from a third party or an affiliate, the inventory management system may not have the information needed to understand all the received information. In such an implementation, the example sub-routine 1000 may request information from the user as to the source of the item and/or determine the source of the item from the information received from the RFID tag. If the user provides the information, the example sub-routine 1000 may send a request to the source of the item for an identification of the item and for disposition options. Disposition options, as discussed below, may include instructions as to what is to be done with the item. For example, the example sub-routine 1000 may request that the source identify if the item can be returned at the item return location, whether credit/refund for the item will be provided by the source, whether the item is to be transferred to the source, etc.

If it is determined that no RFID tag is detected, a determination is made as to whether a visual tag is detected on the placed item, as in 1006. As discussed above, the return location may include or be adjacent to one or more image capture devices (e.g., cameras, bar code reader) that can capture images and/or scan the placed item to determine if the placed item includes a visual tag. If it is determined that the item includes a visual tag, the corresponding visual tag identifier is utilized to identify the item and obtain the corresponding item information from the materials handling facility item information data store 1315 or the affiliate item identifier data store, as in 1008. The determined item information also includes the source of the item. The determined item information and an identification of the item source are returned, as in 1005.

In some implementations, a visual tag may be detected but the information from the visual tag may not be discernible.

For example, if the item is from a third party or an affiliate, the inventory management system may not have the information needed to understand all the visual tag. In such an implementation, the example sub-routine 1000 may request information from the user as to the source of the item and/or determine the source of the item from the information determined from the visual tag. If the user provides the information, the example sub-routine 1000 may send a request to the source of the item for an identification of the item and for disposition options. Disposition options, as discussed below, may include instructions as to what is to be done with the item. For example, the example sub-routine 1000 may request that the source identify if the item can be returned at the item return location, whether credit/refund for the item will be provided by the source, whether the item is to be transferred to the source, etc.

If it is determined that no visual tag is detected, the weight, shape and/or size of the item is determined, as in 1010. As discussed above, the return location may include a variety of input components, such as a load cell, pressure sensor, scale, camera, dimensioning system, etc. A load cell, pressure sensor, etc. may be utilized to determine a weight of the placed item. Likewise, a load cell, pressure sensor, etc. may be configured to determine the overall shape of a base of the item when placed on the return location. For example, the sensor may be an IFSR sensor that can detect contact at multiple points on the sensor. As another example, the return location may include a dimensioning system (e.g., CubiScan 110) that can scan the placed item and determine the overall dimensions of the item.

Utilizing the determined weight, shape and/or size of the placed item, a determination is made as to whether the placed item corresponds to an item identified in either the materials handling facility item identifier data store or the affiliate item identifier data store, as in 1012. Specifically, one or more of the determined weight, shape and/or size of the placed item may be compared with item information maintained in the materials handling facility item information data store and the affiliate item information data store to identify items having a similar weight, shape and/or size. In some implementations, the determined weight, shape and/or size of the placed item may be compared with stored item information corresponding to items identified in a user profile as associated with the user. For example, item identifications of items purchased by a user may be associated with and maintained in a user profile of the user.

If it is determined at decision block 1012 that the weight, size and/or shape of the placed item corresponds with item information for one or more items identified in either the materials handling facility item information data store or the affiliate item information data store, a list of potential items is established and the item is identified using the image based item identification sub-routine 700, discussed above with respect to FIG. 7. If it is determined that the weight, shape and/or size of the placed item does not correspond with a stored item identifier, the sub-routine returns that the item is not identifiable, as in 1014. In some implementations, the images of the item and/or other item information (e.g., weight, shape, and/or size) of the item may be provided to a user for manual item identification before it is determined that the item is not identifiable. For example, the item information may be provided to an employee of the materials handling facility for manual identification. Alternatively, or in addition thereto, a request may be provided to the user that placed the item to identify the item.

Figure 11A:
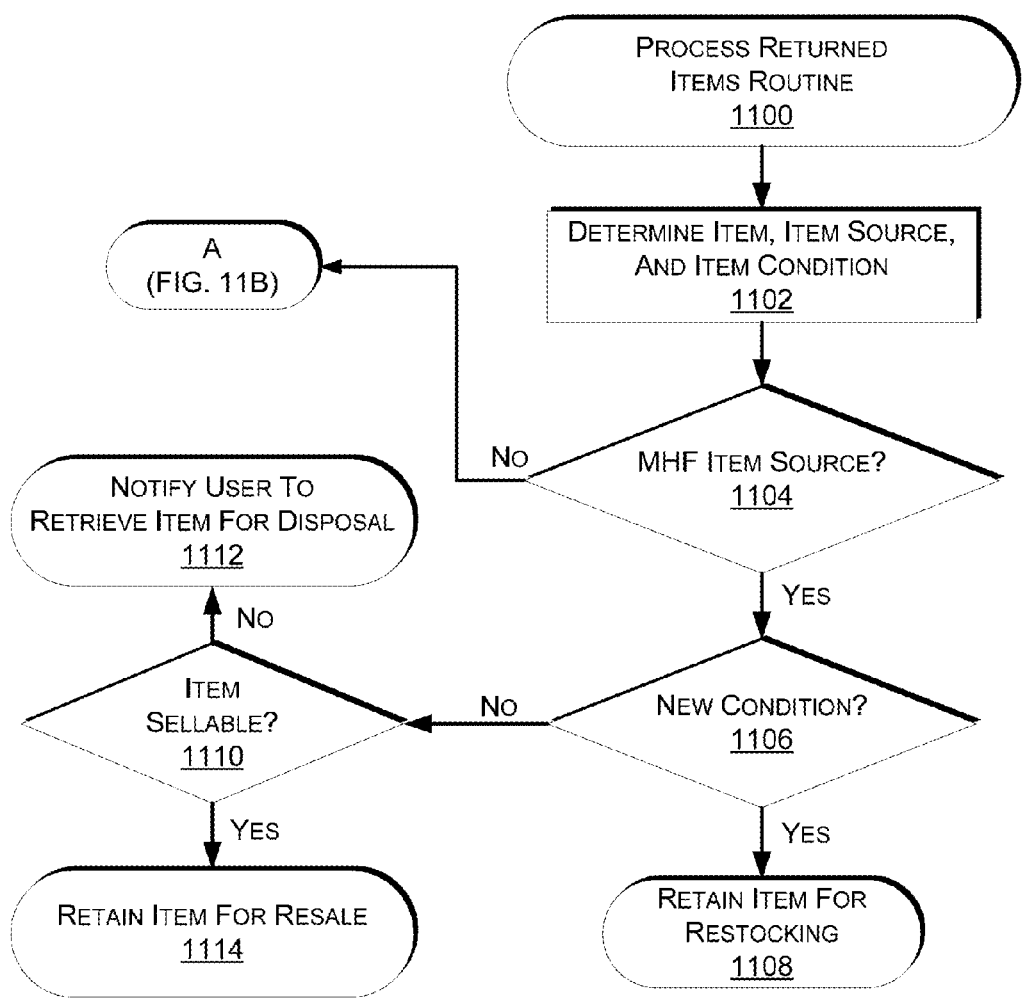
FIGS. 11A-11B depict an example routine for processing items placed at a return location, according to an implementation.
Figure 11B:
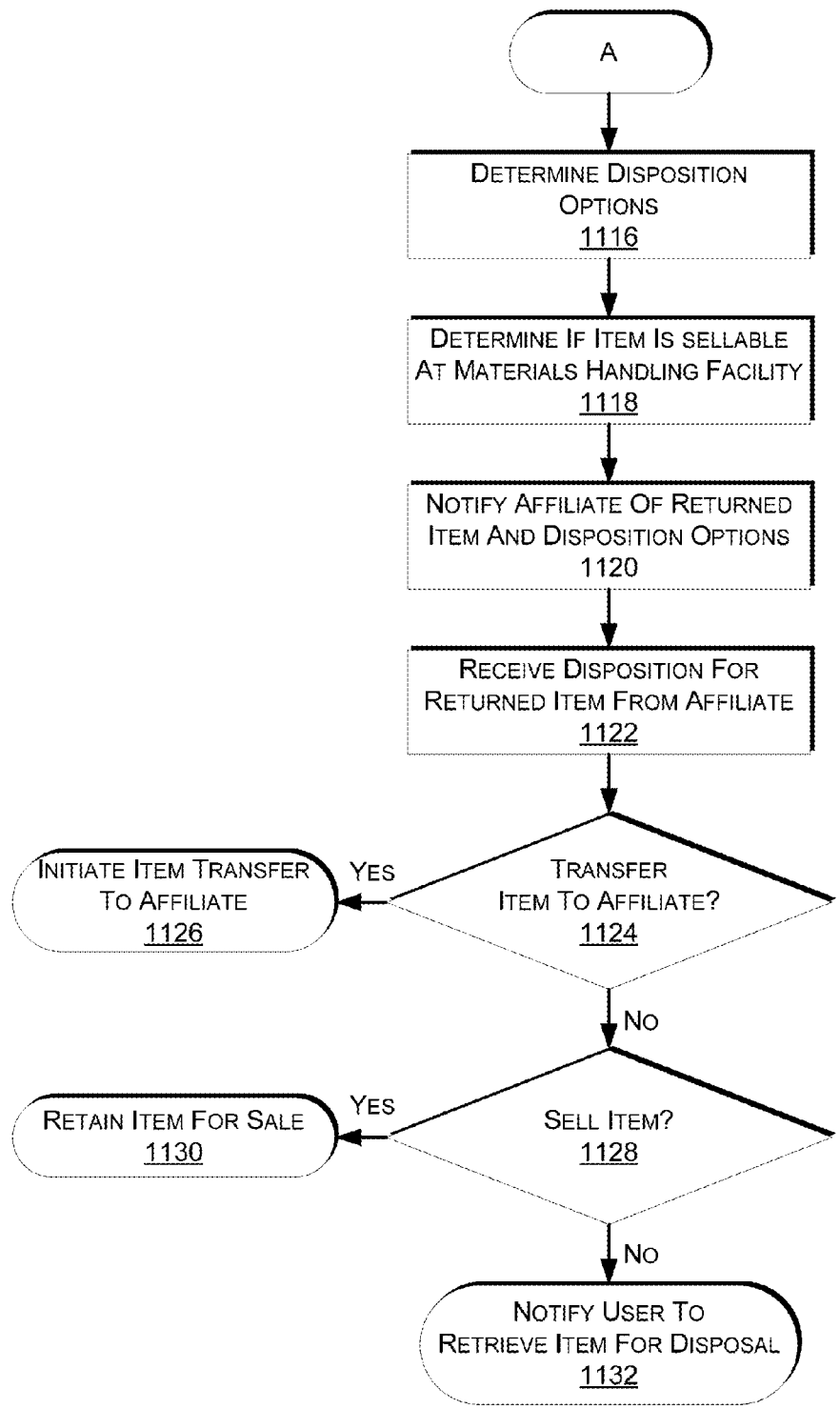

FIGS. 11A-11B depict a flow diagram of an example routine 1100 for processing returned items, according to an implementation. The example routine 1100 begins by determining the item, the item source, and the item condition, as in 1102. The condition of the item may be determined by processing one or more images of the item that were captured when the item was placed at the return location and/or by processing images of the item when stored in a storage compartment of the return location. For example, similar to the techniques for identifying the item using image comparison, as discussed above with respect to FIG. 7, images of the placed item may be compared to stored images of the item to determine if the item has been opened, damaged, partially used, etc. For example, if the item is a bag of cookies, images and/or weight of the returned bag may be compared with stored images and/or stored weight information included in the stored item information associated with the item. The item identity and the item source are already determined for the item, as discussed above with respect to FIG. 10.

A determination is also made as to whether the item source is the materials handling facility, as in 1104. If it is determined that the item source is the materials handling facility, a determination is made as to whether the condition of the item is new, as in 1106. If it is determined that the condition of the returned item is new, the item is retained for restocking in the materials handling facility, as in 1108. However, if it is determined that the item is not new, a determination is made as to whether the item is in a sellable condition, as in 1110. Determining if the item is in a sellable condition may consider a variety of factors. For example, the images may be further processed to determine the condition of the item. Likewise, a user may provide to the return location a reason for the return (e.g., broken, did not fit). In some implementations, a user (e.g., materials handling facility agent) may manually review the returned item to determine if the item is sellable.

If it is determined that the item is not sellable, a user is notified and instructed to retrieve the item from the return location and dispose of the item, as in 1112. Alternatively, one or more of the storage compartments of the drop location may be designated for receiving items that are to be disposed. In such an implementation, the user may receive a notification to place the item into a storage compartment that has been designed for items to be disposed. In comparison, if it is determined that the item is in a sellable condition, the item is retained for resale, as in 1114. For example, the item may be re-sold as a used item, sold at a discounted price, etc.

Returning to decision block 1104, if it is determined that the item is not a materials handling facility item, turning now to FIG. 11B, a condition of the item is determined, as in 1116. The condition of the item may be determined in a manner similar to that discussed above with respect to block 1102. Based on the determined condition of the item, a determination is made as to the potential disposition options for the item, as in 1118. For example, it may be determined whether the item is sellable at the materials handling facility, if the condition of the item is new and space exists in the storage area for the item, etc. In another example, if the condition of the item is used, it may still be determined that the item is sellable as a used item.

Disposition options may identify whether the item can be made available for sale at the materials handling facility, disposed of, returned to the affiliate, etc. Likewise, in some implementations, based on the arrangement between the materials handling facility and the affiliate, the disposition may be predefined. For example, in implementations where the materials handling facility is authorized to complete a refund or credit for the item, the materials handling facility may likewise be authorized to make the item available for sale and utilize any proceeds from the sale to offset the refund or credit amount provided.

The identification of the item, the item condition and disposition options for the item may then be provided to the source of the item, as in 1120. A disposition decision is received from the affiliate, as in 1122. Based on the disposition decision, a determination is made as to whether the item is to be transferred to the affiliate, as in 1124. If the item is to be transferred to the affiliate, the transfer is initiated, as in 1126. For example, a shipment or other transport of the item to an affiliate specified location may be initiated. However, if it is determined that the item is not to be transferred to the affiliate, a determination is made as to whether the item is to be made available for sale, as in 1128. For example, if the item is a new item, it may be made available for sale at the materials handling facility. If the item condition is used, the item may be sold as a used item. If the item is to be made available for sale, the item is retained, as in 1130.

Finally, if it is determined that the item is not to be made available for sale, a user is notified to retrieve the item from the return location and dispose of the item, as in 1132.

Figure 12:
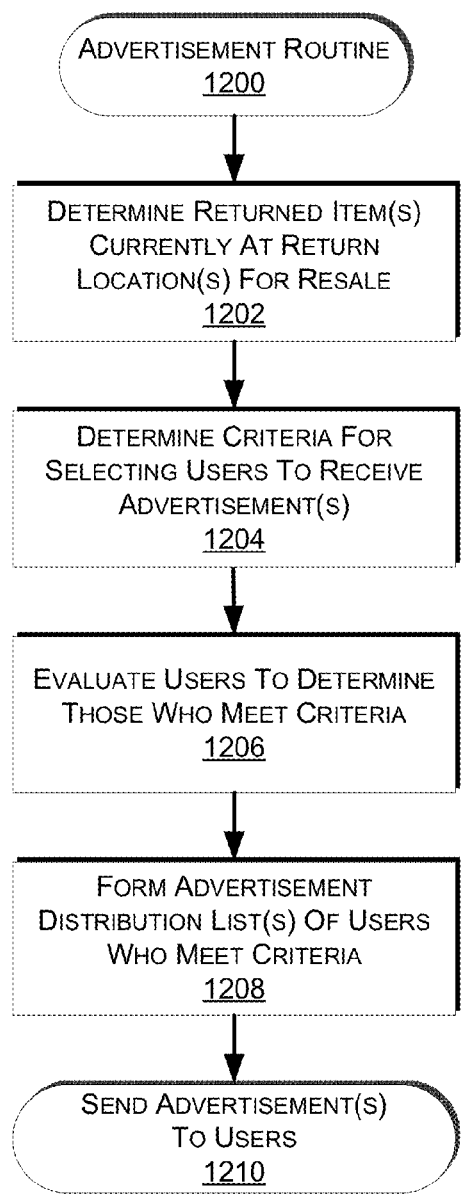
FIG. 12 depicts an example advertisement routine, according to an implementation.

FIG. 12 is a flow diagram illustrating an example advertisement routine 1200, according to an implementation. The example routine 1200 initiates with a determination of one or more items that are currently at one or more return locations and are ready to be advertised for sale, as in 1202. As described above, returned items may be offered for sale based on the determined condition of the retuned item.

For items at the return location that are to be made available for sale, criteria are determined for selecting users to receive advertisements for the sale of the item, as in 1204. In various implementations, the criteria for selecting users may include whether the users have requested to be on a distribution list for the given return location or materials handling facility. In one implementation, users may request to be on a distribution list for all items at the item release location, or for only certain types of items, items of a certain condition, or within certain dates or times. Users may also be selected based on their previous use of the materials handling facility where the return location is located. In some instances, users currently located at the materials handling facility may be identified as users for which advertisements are to be presented. Users may also be selected based on the proximity of a stored delivery address of the user to the return location, such as an address being within the geographic range of the return location. For example, users who live or work near the return location may be determined to be more likely to purchase returned items that are available for sale from the return location.

Once the criteria for selecting users are determined, users are evaluated to determine those who meet the criteria, as in 1206. Advertisement distribution lists are then formed of the users who meet the criteria, as in 1208. In various implementations, there may be different advertisement distribution lists for different items at a return location, or there may be a single advertisement distribution list for all of the items at a return location. The advertisements for the items are then sent to the users on the advertisement distribution lists, as in 1210. In some instances, the advertisements may be provided relatively immediately to a user, such as an advertisement being provided on a user interface 211 of a return location 200, when a user arrives at the materials handling facility, sent via electronic message to the user, presented on an output device to a user located in the materials handling facility, etc.

While the above example discusses the return of a purchased item, the implementations discussed here are also applicable to the return of rented, borrowed, or leased items. For example, the refund or credit may be an acknowledgement that the item has been returned. The example routine 1200 may also determine if the item remains in a condition such that it may be provided for rental, lease, borrow, etc.

Figure 13:
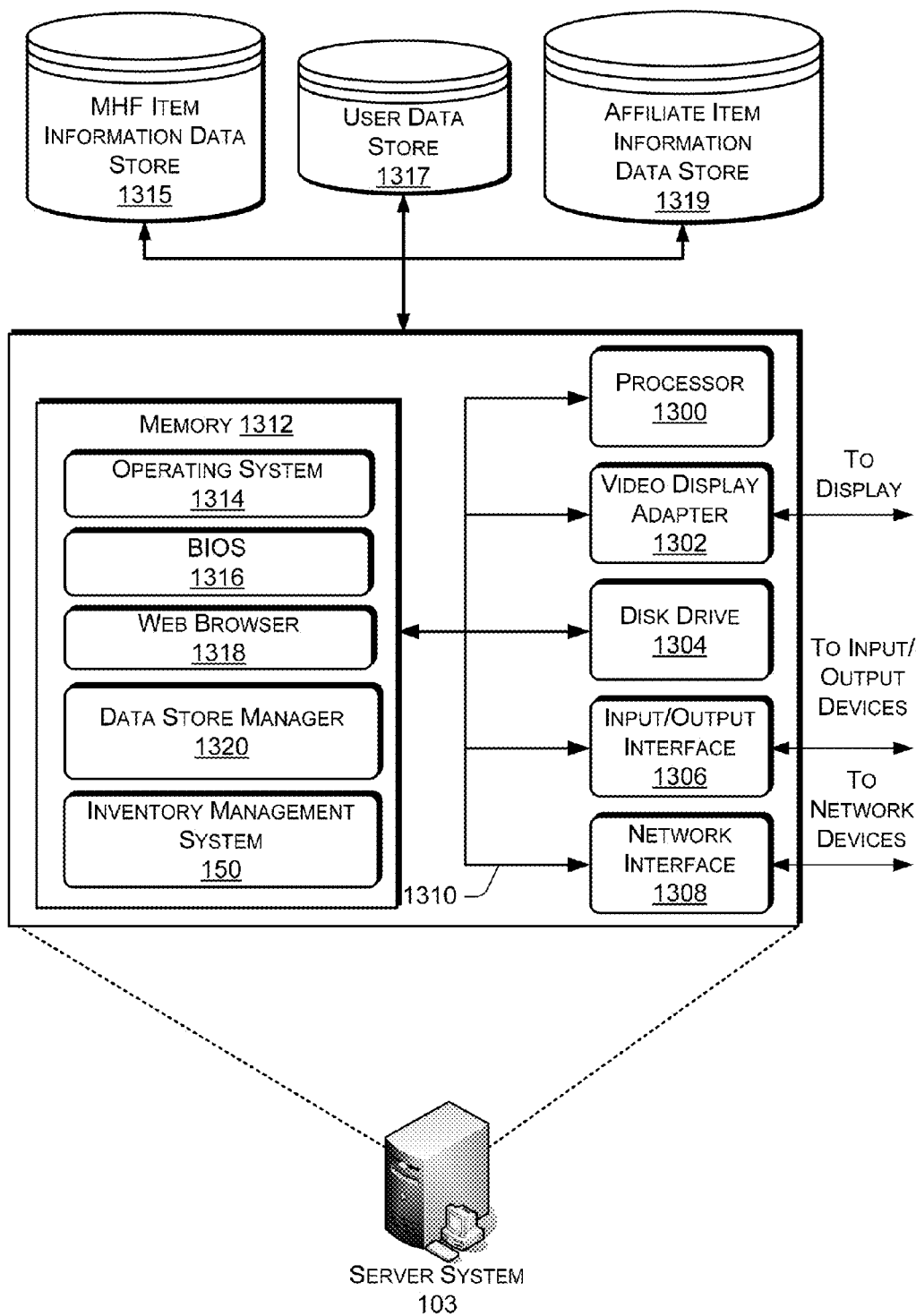
FIG. 13 is a block diagram of an illustrative implementation of a server system that may be used with various implementations.

FIG. 13 is a pictorial diagram of an illustrative implementation of a server system, such as the server system 103 that may be used in the implementations described herein. The server system 103 may include a processor 1300, such as one or more redundant processors, a video display adapter 1302, a disk drive 1304, an input/output interface 1306, a network interface 1308, and a memory 1312. The processor 1300, the video display adapter 1302, the disk drive 1304, the input/output interface 1306, the network interface 1308, and the memory 1312 may be communicatively coupled to each other by a communication bus 1310.

The video display adapter 1302 provides display signals to a local display (not shown in FIG. 13) permitting an operator of the server system 103 to monitor and configure operation of the server system 103. The input/output interface 1306 likewise communicates with external input/output devices not shown in FIG. 13, such as a mouse, keyboard, scanner, or other input and output devices that can be operated by an operator of the server system 103. The network interface 1308 includes hardware, software, or any combination thereof, to communicate with other computing devices. For example, the network interface 1308 may be configured to provide communications between the server system 103 and other computing devices via a network, as shown in FIG. 1B.

The memory 1312 generally comprises random access memory (RAM), read-only memory (ROM), flash memory, and/or other volatile or permanent memory. The memory 1312 is shown storing an operating system 1314 for controlling the operation of the server system 103. A binary input/output system (BIOS) 1316 for controlling the low-level operation of the server system 103 is also stored in the memory 1312.

The memory 1312 additionally stores program code and data for providing network services that allow the inventory management system 150 to process images and automatically update the materials handling facility item information data store or the affiliate item information data store. Accordingly, the memory 1312 may store a browser application 1318. The browser application 1318 comprises computer executable instructions, that, when executed by the processor 1300 generate or otherwise obtain configurable markup documents such as Web pages. The browser application 1318 communicates with a data store manager application 1320 to facilitate data exchange between the materials handling facility item information data store 1315, the user data store 1317 and/or the affiliate item information data store 1319.

As used herein, the term "data store" refers to any device or combination of devices capable of storing, accessing and retrieving data, which may include any combination and number of data servers, databases, data storage devices and data storage media, in any standard, distributed or clustered environment. The server system 103 can include any appropriate hardware and software for integrating with the data stores 1315, 1317, 1319 as needed to execute aspects of the inventory management system 150.

The data stores 1315, 1317, 1319 can include several separate data tables, databases or other data storage mechanisms and media for storing data relating to a particular aspect. For example, the data stores 1315, 1317, 1319 illustrated include mechanisms for inventory information, user information, item image information, etc. which can be used to identify an item picked from an inventory location, placed at a drop location and/or placed at a return location.

It should be understood that there can be many other aspects that may be stored in the data stores 1315, 1317, 1319. The data stores 1315, 1317, 1319 are operable, through logic associated therewith, to receive instructions from the server system 103 and obtain, update or otherwise process data in response thereto.

The memory 1312 may also include the inventory management system 150, discussed above. The inventory management system 150 may be executable by the processor 1300 to implement one or more of the functions of the server system 103. In one implementation, the inventory management system 150 may represent instructions embodied in one or more software programs stored in the memory 1312. In another implementation, the inventory management system 150 can represent hardware, software instructions, or a combination thereof.

The server system 103, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction in FIG. 13 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
   one or more processors; and
   a memory coupled to the one or more processors and storing program instructions that when executed by the one or more processors cause the one or more processors to at least:
   determine that an item has been placed at an item release location located within a materials handling facility;
   obtain a first image of a user that placed the item at the item release location;
   process the first image of the user that placed the item at the item release location to identify the user;
   obtain a second image of the item placed at the item release location;
   process a second image of the item placed at the item release location to identify the item;
   determine that the item placed at the item release location is associated with the user;
   remove the association between the user and the item placed at the item release location; and
   update a user profile associated with the user to indicate a return of the item by the user.

2. The computing system of claim 1, wherein the program instructions that when executed by the one or more processors cause the one or more processors to determine that the item placed at the item release location is associated with the user, further cause the one or more processors to at least:
   compare an item identifier representative of the identified item with item identifiers included on an item identifier list associated with the user, wherein the item identifier list identifies items picked by the user while located in a storage area of the materials handling facility; and
   determine that the item identifier representative of the identified item corresponds to an item identifier included on the item identifier list.

3. The computing system of claim 1, wherein:
   the item release location is an item drop location located within a storage area of the materials handling facility;
   the removal of the association between the user and the item placed at the item release location includes removing the item from an item identifier list associated with the user; and
   the item identifier list identifies items picked by the user while located in the storage area of the materials handling facility.

4. The computing system of claim 1, wherein:
   the item release location is an item return location positioned within a transition area of the materials handling facility; and the update of the user profile associated with the user to indicate a return of the item by the user includes updating the user profile to credit the user for the return of the item.

5. A system, comprising:
   an item release location including:
   an item placement shelf configured to receive an item placed at the item release location; and
   an input component configured to obtain information about the placed item and provide the information about the placed item to a computing system;
   the computing system, including:
   one or more processors; and
   a memory coupled to the one or more processors and storing program instructions that when executed by the one or more processors cause the one or more processors to at least:
   receive the information about the placed item;
   process the information about the placed item to identify the placed item;
   update user information for a user that placed the item at the item release location;
   determine that the item is to be retained for restocking into a materials handling facility; and
   send an instruction to a second user to retrieve the item and place it in an inventory location within the materials handling facility.

6. The system of claim 5, wherein the input component is at least one of a camera, a pressure sensor, a load cell, a scale, a dimensioning system, a touch-screen display, or an RFID reader.

7. The system of claim 5, wherein the item release location further includes:
   a storage compartment configured to receive and store the item at the item release location.

8. The system of claim 5, the item release location further including:
   a second input component configured to obtain information about the user that placed the item and provide the information about the user to the computing system.

9. The system of claim 8, wherein the second input component is at least one of a camera, a touch-screen display, or an RFID reader.

10. The system of claim 8, wherein the program instructions that when executed by the one or more processors further cause the processors to at least:
receive the obtained information about the user; and
process the obtained information about the user to identify the user.

11. The system of claim 9, wherein the program instructions that when executed by the one or more processors further cause the one or more processors to at least:
determine that an item identifier representative of the identified item is included on an item identifier list associated with the user; and
update the item identifier list to remove the item identifier representative of the identified item.

12. The system of claim 9, wherein the program instructions that when executed by the one or more processors further cause the processors to at least:
determine that an item identifier representative of the identified item is included in a purchase history associated with the user; and
provide a refund or a credit to the user for a return of the item placed at the item release location.

13. The system of claim 5, wherein the information about the placed item includes an image of the placed item; and
wherein program instructions that when executed by the one or more processors to process the obtained information about the placed item, further include instructions that when executed by the one or more processors cause the one or more processors to at least:
process the image of the placed item to determine an arrangement of features represented in the placed item;
compare the arrangement of features represented in the image of the placed item with stored item information representative of items located in a materials handling facility; and
identify, based at least in part on a comparison, the item.

14. A computer-implemented method, comprising:
under control of one or more computing systems configured with executable instructions,
identifying, using first data collected by at least one of a plurality of input components at an item release location, a user at the item release location, wherein the item release location is a return location configured to receive an item that has been transitioned from a materials handling facility;
identifying, using second data collected by at least one of a plurality of input components at the item release location, an item placed by the user at the item release location;
determining an association between the item placed by the user at the item release location and the user; and
updating, based at least in part on the association between the item placed by the user at the item release location and the user, a user profile associated with the user, wherein updating the user profile includes indicating a return of the item by the user at the item release location.

15. The computer-implemented method of claim 14, wherein:
the item release location is an item drop location configured to receive an item picked by a user from an inventory location of a materials handling facility, wherein the item has not been transitioned from the materials handling facility; and
updating the user profile includes removing an item identifier representative of the item placed at the release location from an item identifier list associated with the identified user.

16. The computer-implemented method of claim 14, wherein:
updating the user profile to indicate a return of the item includes providing a refund or credit to the user for the return of the item.

17. The computer-implemented method of claim 14, wherein the item release location is further configured to receive an item that has been transitioned from an affiliate of the materials handling facility.

18. The computer-implemented method of claim 14, further comprising:
providing a notification to the user that the item placed by the user at the item release location has been identified and the user profile associated with the user has been updated.

19. The computer-implemented method of claim 14, further comprising:
determining at least one of an RFID tag identifier, a visual tag identifier, a weight, a size, or a shape of the item placed by the user at the item release location; and
wherein identifying the item placed at the item release location includes:
determining that at least one of the RFID tag identifier, the visual tag identifier, the weight, the size, or the shape of the item corresponds to an item associated with the user.

20. A system, comprising:
an item release location including:
an item placement shelf configured to receive an item placed at the item release location; and
a computing system, including:
one or more processors; and
a memory coupled to the one or more processors and storing program instructions that when executed by the one or more processors cause the one or more processors to at least:
receive information about the placed item; and
update user information for a user that placed the item at the item release location; and
provide a notification to the user that the item placed at the item release location has been identified and the user information has been updated.

21. The system of claim 20, wherein the item release location further includes an input component configured to obtain information about the placed item and provide the information about the placed item to the computing system.

22. The system of claim 20, wherein the program instructions that when executed by the one or more processors further cause the processors to at least:
process the information about the placed item to identify the placed item.

23. The system of claim 20, the item release location further including:
a second input component configured to obtain information about the user that placed the item and provide the information about the user to the computing system.

* * * * *

UNITED STATES PATENT AND TRADEMARK OFFICE
CERTIFICATE OF CORRECTION

| | |
|---|---|
| PATENT NO. | : 10,268,984 B1 |
| APPLICATION NO. | : 14/500805 |
| DATED | : April 23, 2019 |
| INVENTOR(S) | : Sudheer Babu Ramoji et al. |

It is certified that error appears in the above-identified patent and that said Letters Patent is hereby corrected as shown below:

On the Title Page

Item (72), Fifth inventor's first name is Gopi Prashanth – no middle name.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*